US012627727B2

(12) United States Patent

Merwaday et al.

(10) Patent No.: US 12,627,727 B2

(45) Date of Patent: May 12, 2026

(54) METHODS AND DEVICES FOR PROVIDING A DISCOVERY SERVICE FOR A NETWORK INCLUDING COLLABORATIVE AGENTS

(71) Applicant: Intel Corporation, Santa Clara, CA (US)

(72) Inventors: Arvind Merwaday, Hillsboro, OR (US); Satish Jha, Portland, OR (US); Rath Vannithamby, Portland, OR (US); Dave Cavalcanti, Portland, OR (US); Susruth Sudhakaran, Beaverton, OR (US); Mark Eisen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/876,565

(22) Filed: Jul. 29, 2022

(65) Prior Publication Data

US 2024/0039982 A1     Feb. 1, 2024

(51) Int. Cl.
H04L 67/10         (2022.01)
H04L 67/51         (2022.01)

(52) U.S. Cl.
CPC .............. H04L 67/10 (2013.01); H04L 67/51 (2022.05)

(58) Field of Classification Search
CPC ................................ H04L 67/10; H04L 67/51
See application file for complete search history.

(56) References Cited

U.S. PATENT DOCUMENTS

2007/0011281 A1 *   1/2007   Jhoney ................... G06Q 10/10
                                                    709/220
2019/0171438 A1 *   6/2019   Franchitti ................ G06N 3/08

FOREIGN PATENT DOCUMENTS

WO       WO-2011123919 A1 *   10/2011   ............ H04W 76/50
WO       WO-2017215732 A1 *   12/2017   ....... G05B 19/41815
WO       WO-2021084545 A1 *    5/2021   ............. H04W 8/24

OTHER PUBLICATIONS

Eprosima; "eProsima Discovery Server"; https://www.eprosima.com/index.php/products-all/tools/eprosima-discovery-server, retrieved on Jul. 28, 2022; 5 pages.

(Continued)

*Primary Examiner* — Cheikh T Ndiaye
(74) *Attorney, Agent, or Firm* — Viering, Jentschura & Partner mbB

(57)         ABSTRACT

A device may include a processor configured to obtain context information of a plurality of nodes that are configured to communicate according to a publish and subscribe pattern, wherein the context information represents attributes associated with services that each node is able to provide for a collaboration with a further node; determine, in response to a received collaboration request representative of one or more conditions of a collaboration sought by a requester node, one or more nodes of the plurality of nodes that meet the one or more conditions of the collaboration based on the context information of the plurality of nodes; and encode discovery information for a transmission to the requester node, wherein the discovery information is representative of an attribute required to communicate with the determined one or more nodes according to the publish and subscribe pattern.

24 Claims, 9 Drawing Sheets

Obtaining context information of a plurality of nodes that are configured to communicate according to a publish and subscribe pattern, wherein the context information represents attributes associated with services that each node is able to provide for a collaboration with a further node    1301

Determining, in response to a received collaboration request representative of one or more conditions of a collaboration sought by a requester node, one or more nodes of the plurality of nodes that meet the one or more conditions of the collaboration based on the context information of the plurality of nodes    1302

Encoding discovery information for a transmission to the requester node, wherein the discovery information is representative of an attribute required to communicate with the determined one or more nodes according to the publish and subscribe pattern    1303

(56) References Cited

OTHER PUBLICATIONS

ROS 2 Documentation; "Using Fast DDS Discovery Server as discovery protocol [community-contributed]"; https://docs.ros.org/en/foxy/Tutorials/Advanced/Discovery-Server/Discovery-Server.html?highlight=discovery; retrieved on Jul. 28, 2022; 10 pages.

3rd Generation Partnership Project, "Technical Specification Group Radio Access Network; Study on LTE Device to Device Proximity Services; Radio Aspects", Mar. 2014, 50 pages, Technical report, TR 36.843, v12.0.1.

* cited by examiner

200

202          204          206          210          212

300

305

700

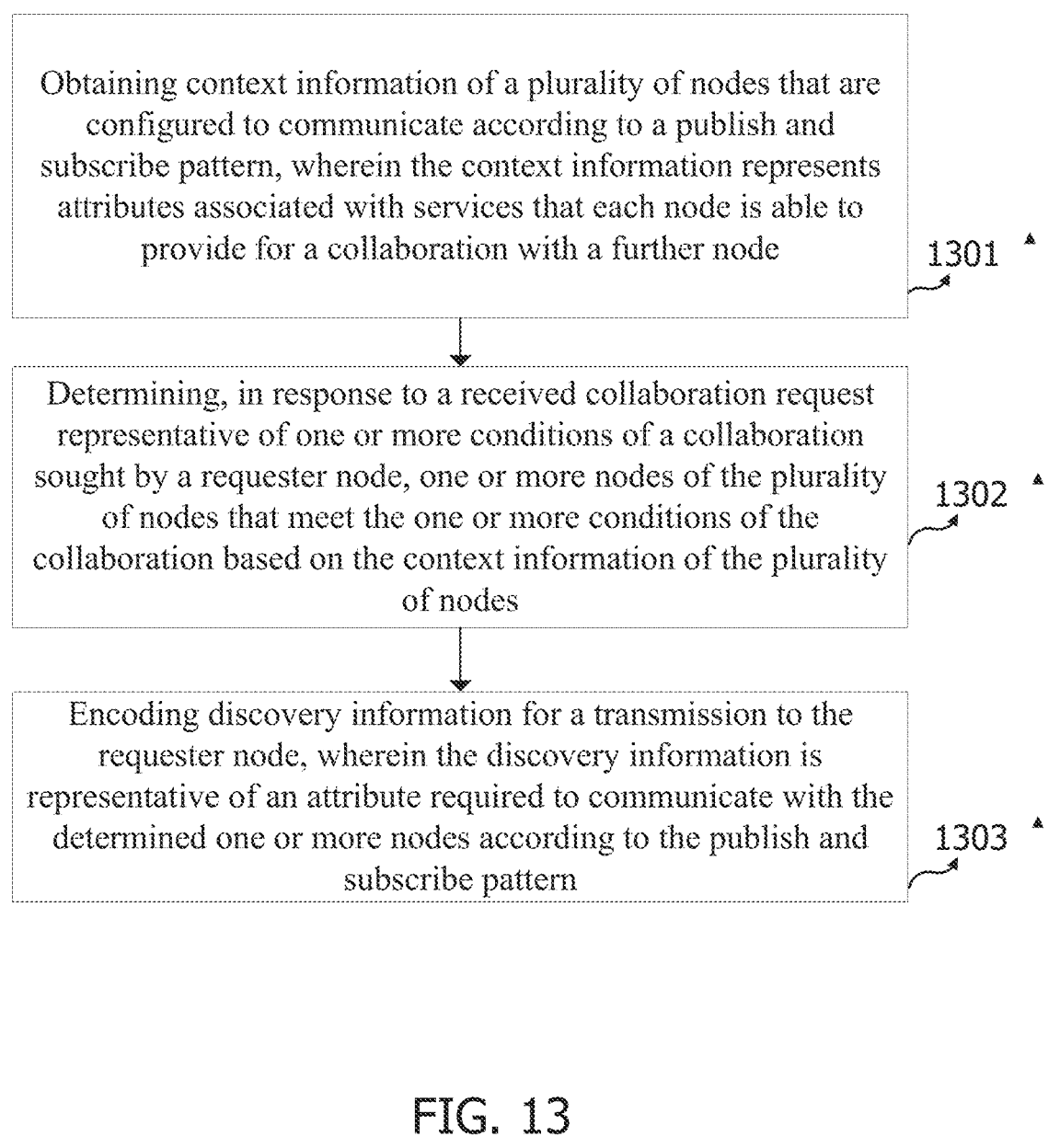

Obtaining context information of a plurality of nodes that are configured to communicate according to a publish and subscribe pattern, wherein the context information represents attributes associated with services that each node is able to provide for a collaboration with a further node          1301

Determining, in response to a received collaboration request representative of one or more conditions of a collaboration sought by a requester node, one or more nodes of the plurality of nodes that meet the one or more conditions of the collaboration based on the context information of the plurality of nodes          1302

Encoding discovery information for a transmission to the requester node, wherein the discovery information is representative of an attribute required to communicate with the determined one or more nodes according to the publish and subscribe pattern          1303

FIG. 13

METHODS AND DEVICES FOR PROVIDING A DISCOVERY SERVICE FOR A NETWORK INCLUDING COLLABORATIVE AGENTS

TECHNICAL FIELD

This disclosure generally relates to methods and devices to provide a discovery service within a network including collaborative agents.

BACKGROUND

In accordance with various communication systems, in particular involving the communication of multiple agents communicating via multiple communication devices in a service-based architecture, the communication of the information between software agents may be based on a publish/subscribe pattern, in which a publisher (an entity sending a message) may categorize a message to be published into a particular topic without the knowledge of the subscribers of the topics, and one or more subscribers (entities intending to receive the message) may receive the message sent by the publishers when they subscribe to the particular topic. A publish/subscribe broker may keep necessary information, and it may receive published messages from publishers and forward the published messages to subscribers based on the respective topics of the published messages.

In dense and dynamic environments involving multiple agents communicating with each other using the publish/subscribe pattern within a network and capable of cooperating with each other by providing distinct services to perform a task collaboratively, it may be desirable for an agent to discover other agents that the agent can collaborate with to perform the task.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 13 shows an example of a method.

DESCRIPTION

Figure 1:
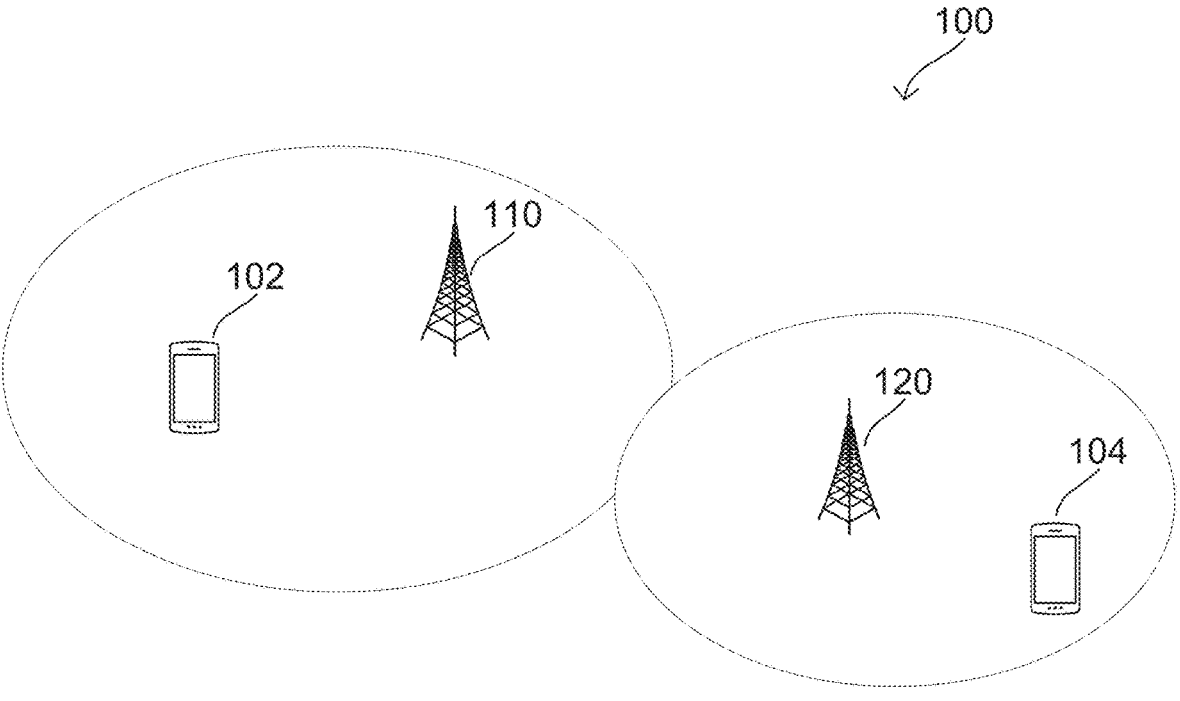
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "agent" refers to any entity (e.g. a software operating in a hardware) that is situated in some environment and capable of performing an autonomous action in order to meet its design objectives. An agent provided in this disclosure may include an intelligent agent (that may be configured to exhibit aspects of artificial intelligence), an autonomous agent (that may be configured to perform autonomous operations), distributed agents (that may be configured to be executed on distinct computing devices), multi-agent systems (including distributed agents that cooperate together to achieve a goal or perform a task).

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

As used herein, "communication device" may refer to any type of electronic devices that are able to exchange information with at least another device, for example according to various types of radio communication technologies and using various types of communication protocols as exemplarily provided herein. Exemplarily, a communication device may be, or may include, an access point, a station, any types of user devices which may include a suitable device including a processor, that may include, a mobile device or a non-mobile device, a user equipment (UE), a computing device, such as a personal computer (PC), a desktop computer, a mobile computer, a laptop computer, a notebook computer, a tablet computer, a server, a handheld computing device, a wearable device, such as a smart bracelet, a smart watch, smart glasses, a smart ring, etc., an internet of things (IoT) device, a sensor, a mobile phone, a cellular telephone, any types of wireless accessories, such as a headphone, a headset, a microphone, a speaker, a domotics (smart home) device, an autonomous machine, and edge device, a fog device, a cloud device, etc.

As used herein, the term "service" may refer to any action (e.g. retrieving information, processing data, controlling actuators, environment sensing, outputting information) performed by the agent to perform a task.

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel.

15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies including Wireless Personal Area Network (WPAN) standards (e.g., according to any IEEE 802.15 standard), Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as micro-cells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

In accordance with various aspects of this disclosure, a discovery procedure may be facilitated by a device, in which a node of a publish/subscribe based communication network may discover another node of the publish/subscribe based communication network in order to perform a task collaboratively with the another node of the publish/subscribe based communication network. In order to perform the task collaboratively, the node may provide one or more services and the another node may provide one or more services to complete the task.

Figure 2:
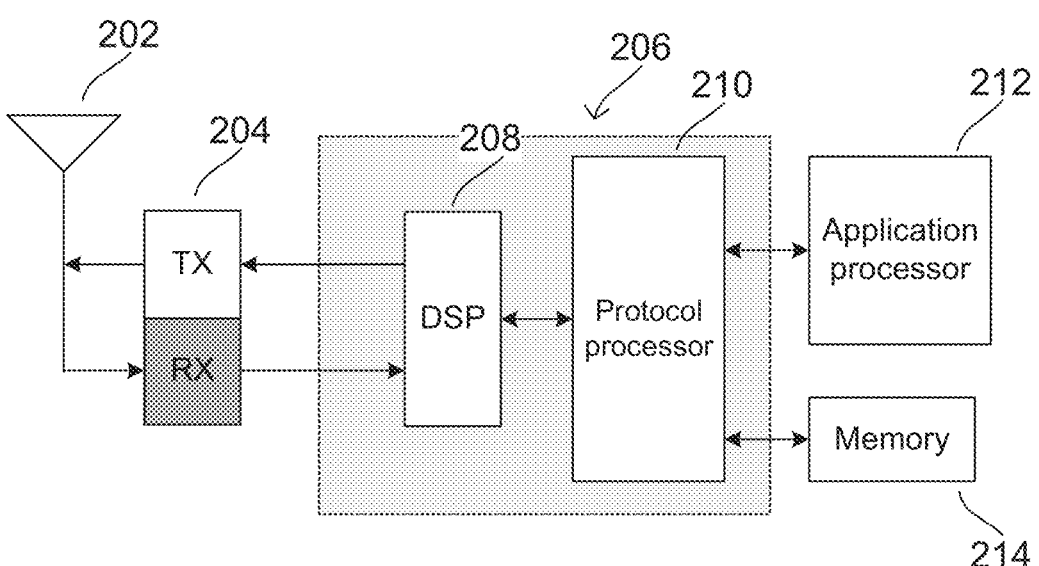
FIG. 2 shows an exemplary internal configuration of a communication device.

FIGS. 1 and 2 depict a general network and device architecture. FIG. 1 and FIG. 2 intend to provide aspects associated with radio communication network, but this should not be taken as limiting. The aspects provided in this disclosure may apply to any communication network architecture, including wired communication. In such example, the terminal devices may be wired terminal devices, and network access nodes may include router devices, gateway devices, network switches, network hubs, etc. In particular, FIG. 1 shows exemplary radio communication network 100 according to some aspects, which may include communication devices depicted as terminal devices 102 and 104 and communication devices depicted as network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount. In various examples, terminal devices 102 and 104 may communicate with each other without involvement of the radio access network, such as over a peer to peer network.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network, the edge network, and/or the fog network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100), the edge network, and/or the fog network, and external data networks (e.g., data networks providing voice, text, multimedia (audio, video, image), and other Internet and application data). In both cellular context and the short-range context cases, the edge network and the fog network may provide access to further terminal devices into the edge network (e.g. edge devices, edge nodes) and into the fog network (e.g. the fog devices, fog nodes) respectively.

The radio access network and core network (if applicable, such as for a cellular context), the edge network and/or the fog network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device. The communication device may include a terminal device 102 according to some aspects, and it will be referred to as terminal device 102, but the communication device may also include various aspects of network access nodes 110, 120 as well. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling, and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs or software programs with the data and/or presentation of the data to a user via a user interface.

In various examples, the application processor 212 may further be configured to implement the agent, or execute one or more instructions to act as the agent, that is configured to provide a service in accordance with various aspects provided herein.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112.

Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
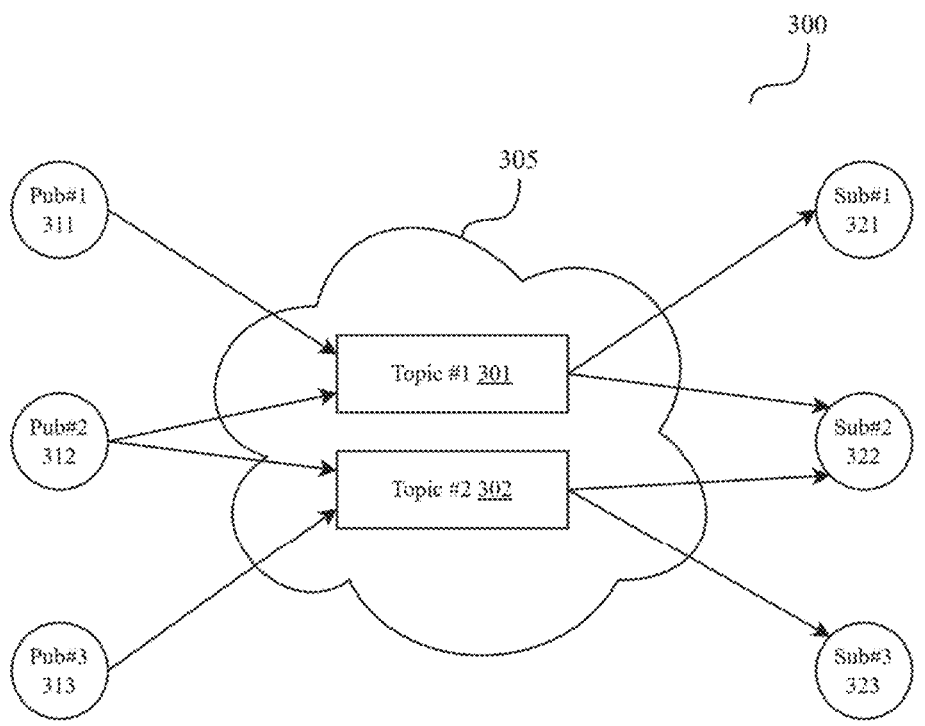
FIG. 3 shows an exemplary illustration of a publish/subscribe-based communication network environment including nodes associated with agents operating in communication devices.

FIG. 3 shows an exemplary illustration of a publish/subscribe-based communication network environment including nodes associated with agents operating in communication devices. In this illustrative example, each node 311, 312, 313, 321, 322, 323 refers to an agent operating on a device configured to communicate with other nodes in the publish/subscribe-based communication network 300. In various examples, each published message is associated with one or more topics, and subscribers may receive messages associated with topics to which they have subscribed.

In various examples, each topic may represent data of a designated type, where type may be a structural type associated with the structure of the data, a content type associated with the content of the data, a priority type associated with the priority of the data, and such. In other words, a topic may provide identification with respect to the messages to be published in the publication channel, so that subscribers may only receive data they desire instead of receiving all data sent by the nodes. Subscribers may receive published messages associated with a topic by subscribing to that topic or by subscribing to a topic description that includes, or that is associated with, that topic. Topic description is an abstract class configured to serve as the base for all classes describing a data flow.

In this illustrative example, nodes 311, 312, 313 are configured as publishers. Node 311 operates as publisher #1 and is configured to publish messages associated with Topic #1 301, node 312 operates as publisher #2 and is configured to publish messages associated with Topic #1 301 and Topic #2 302, node 313 operates as publisher #3 and is configured to publish messages associated with Topic #2 303. Node 321 operates as subscriber #1 and has subscribed to Topic #1 301. Node 322 operates as subscriber #2 and has subscribed to Topic #1 301 and Topic #2 302, node 323 operates as subscriber #3 and has subscribed to Topic #2 302.

Accordingly, when node 311 or node 312 send messages associated with Topic #1 301, both node 321 and node 322 may receive the messages associated with Topic #1 301. Similarly, when node 312 or node 313 send messages associated with Topic #2 302, both node 322 and node 323 may receive the messages associated with Topic #2. Messages associated with Topic #1 301 do not reach node 323, and messages associated with Topic #2 302 do not reach node 321. Any node can be a publisher or subscriber for a topic, and any node can have different roles for different topics. A node may be both subscriber and publisher for a topic.

In various examples, such as MQ Telemetry Transport protocol (MQTT—version published in March 2019), network infrastructure 305 associated with the publish/subscribe pattern may include a broker (a publish/subscribe broker) that is configured to keep information for each topic, such as publisher information representing publishing nodes and subscriber information representing subscriber nodes, and the broker may accordingly cause published messages associated with a topic to be sent to subscribers subscribed to that topic. In various examples, in particular, including Data Distribution Service (DDS) standard (e.g. Object Management Group—Data Distribution Service™ v1.4, published in April 2015), network infrastructure 305 does not include a broker entity designated to act as a broker to deliver messages, but it uses the network infrastructure itself (i.e. a global data space operating as a bus) to write and read data associated with topics, and the messages are exchanged via IP multicast.

Figure 4:
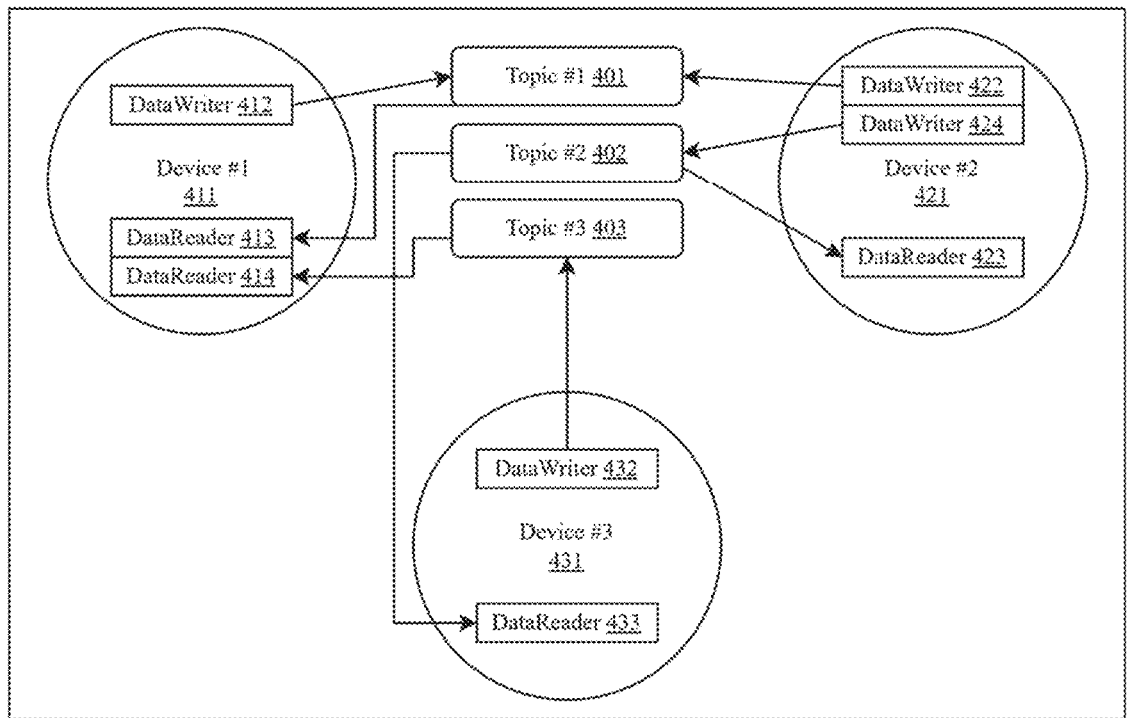
FIG. 4 shows an exemplary representation of a broker-less publish/subscribe architecture.

FIG. 4 shows an exemplary representation of a broker-less publish/subscribe architecture, exemplarily associated with the DDS protocol. DDS is based on a data-centric architecture providing means for connecting anonymous publishers and subscribers. The communication according to broker-less architecture (in a broker included architecture) may be isolated logically or physically in order to limit participants optimally based on the use case. Physical isolation terms may be provided through sub-networks. Communication within a communication architecture may be isolated by using logical isolation operations, such as domains, designated based on various constraints (locations, possible collaboration permutations, tasks to be performed, providable services, etc.).

Accordingly, the domain 400 of the illustrated example includes a first node 411 of the network associated with a first device including a first agent, a second node 421 of the network associated with a second device including a second agent, and a third node 431 of the network associated with a third device including a third agent. Each device provided here may include the communication device 200. All nodes depicted here are associated with both publisher and/or subscriber roles with respect to a first topic 401, a second topic 402, and a third topic 403. In various examples, each node depicted here may include, or may be referred to as, a domain participant, which refers to an entity (that is a device in this example) that may have a publisher role and/or a subscriber role in the domain 400. Each domain 401 may be represented, or indicated, with a domain identifier (domain ID), and entities may publish or receive messages only for the domains that they belong to. An entity (e.g. a node, a device, an agent) may be configured to communicate using publish/subscribe pattern in one or more domains.

Each device may include at least one data reader unit and/or at least one data writer unit that is configured to read or write data messages to a global data space which can be any type of memory on a node (device) in the network, to which any device associated with the domain may access. In accordance with various aspects, in particular, within the context of DDS, the global data space may be physically implemented in a distributed way. In various examples, physical memory that keeps the written data may be a memory of the node that uses the data writer (or may be another node). A data reader unit or a data writer unit may be an endpoint entity that is configured to read or write data to/from the global data space (GDS). In various examples, a data reader unit or a data writer unit may be implemented by software programs (e.g. within respective application programming interfaces (API)).

In this illustrative example, the first node 411 includes a first DataWriter 412 that is configured to write messages associated with the first topic 401, a first DataReader 413 that is configured to read messages associated with the first topic 401, and a second DataReader 414 that is configured to read messages associated with the third topic 403. The second node 421 includes a first DataWriter 422 that is configured to write messages associated with the first topic 401, a second DataWriter 424 that is configured to write messages associated with the second topic 402, and a first DataReader 423 that is configured to read messages associated with the second topic 402. The third node 431 includes a first DataWriter 432 that is configured to write messages associated with the third topic 403 and a first DataReader 433 that is configured to read messages associated with the second topic 402.

Accordingly, each publisher associated with a topic may publish messages by writing a message associated with the respective topic to the GDS using the respective data writer unit, and each subscriber associated with a topic may receive messages by reading a message associated with the respective topic from the GDS using the respective data reader unit. Topics may provide logical channels between DataWriters and DataReaders, representing the data type of respective publication and/or subscription.

In this provided instance of the domain 400, when, as a publisher, the first device 411 or the second device 421 publishes a message associated with the first topic 401, the first device 411 receives, as a subscriber, the message using the first DataReader 413. Similarly, when the second device 421, as a publisher, publishes a message associated with the second topic 402, the second device 421 and the third device 431, as readers, may receive the message. When the third device 431, as a publisher, publishes a message associated with the third topic 403, the first device 411, as a reader, receives the message.

In order to maintain communication between dynamic publishers and subscribers, the communication network may include a discovery procedure to allow new participants to join the communication network or to compensate for the changes in the communication network due to the absence of existing participants within the communication network. In various examples, in particular, within the context of DSS, the discovery procedure may include a two-step procedure.

Each participant of the domain 400 may send multicast or unicast discovery messages (e.g. discovery information) to announce its presence to other participants periodically. In various examples, the discovery messages may be sent to other participants using one or more designated discovery topics associated with the discovery procedure. Each participant of the domain 400 may assign a role of publisher and subscriber within the one or more designated discovery topics in order to send and receive discovery messages. A discovery message may include an identifier of the respective participant (e.g. a globally unique identifier (GUID)), address information required to communicate with the participant (e.g. transport locators, an internet protocol (IP) address, port numbers, etc.), quality of service (QoS) policies of the participant, etc.

After a pair of participants are aware of each other, the participants may exchange discovery messages (e.g. discovery information) including information representing, or indicating, topics that the participants are configured to publish and that the participants are configured to subscribe to (e.g. identifier of the topic, such as topic names, data types, etc.). Through completion of the discovery procedure, a new participant may identify topics that the new participant may publish or subscribe to communicate with other participants.

The publish/subscribe patterned communication may allow messages to be transmitted to different parts of a system in an asynchronous manner. It may provide optimal network scalability and dynamic topology at an expense of a less flexible publisher structure. A publish/subscribe-based communication may be desirable, in particular in multi-agent networks and heterogenous networks, to benefit the scalability and dynamic topology. For example, publish/subscribe-based communication may be used in networks including multiple agents, in which at least two agents may cooperate or collaborate with each other to perform a task. The task may be any kind of task that the agents are configured to perform collectively.

For example, within the context of autonomous machines, the task may be a task associated with autonomous machines that may include one or more subtasks to perform the task (e.g. a subtask of processing a workpiece for manufacturing, carrying a workpiece, storing a workpiece, etc.) operating in designated environments, such as when a first autonomous machine may provide a service including processing a workpiece for manufacturing, and a second autonomous machine may provide another service including carrying the result of manufacturing and store it in designated conditions, in which each autonomous machine may perform its tasks in an autonomous manner (e.g. based on a policy). For example, within the context of distributed computer networks, such as edge computing, fog computing, or cloud computing, the task may be a task associated with processing data in a distributed manner, such as a first computing device may provide sensor data as an outcome of its detection, a second computing device may process the provided sensor data to identify patterns, and a third computing device may store the data in a storage that is accessible by further computing devices, in which each computing device may perform its tasks in an autonomous manner (e.g. via microservices).

Herein the term "collaborate", "collaborative", "collaboration" refers to entities, such as devices (a plurality of autonomous machines, a plurality of edge devices, fog devices, cloud devices), methods, and functions, as examples, which may have certain constraints and conditions, participating to accomplish a task. Examples of collaborative entities may include various types of agents or actors, such as automated machines (e.g., partially of fully autonomous machines), humans, non-automated machines, or non-autonomous machines. Multiple entities (e.g., autonomous machines, edge devices, fog devices, cloud devices, or agents operating within these machines or devices) participating in the task may be affiliated (e.g., assigned) to a group (herein also referred to as group, swarm, team, or as a cluster), e.g., being members (also referred to as agents or as nodes) of the group. Within the context of collaboration to perform a task, the performance of the task may be achieved by at least two services of at least two entities, wherein each service is provided by one of the entities. A task may include any operation, activity that may be replicated or divided among a plurality of devices.

Although, the publish/subscribe-based communication may provide optimal scalability and dynamic topology in relatively small networks and small communication flow, in relatively dense and dynamic environments the likelihood of instabilities may increase, as more agents may use the system, and the communication volume flow may be slower. For example, in an environment in autonomous mobile nodes such as autonomous mobile robots (AMRs) are used extensively to accomplish several different types of tasks, forming and managing collaborations among nodes in such a dense and dynamic scenario, or similarly, as the number of nodes (e.g. hosts) in distributed networks increases, communication between the nodes may be challenging. Topic-based publish/subscribe communication and discovery protocols associated with the pattern may not be sufficient for collaboration between nodes because the topics are static in nature.

Thereby, an isolation or segmentation mechanism may be desirable to contain multiple participants of the whole network in smaller groups (via a number of topics, via sub-networks, via using domains, via implementation of other segmentation methods). Furthermore, in dense networks, the discovery may be challenging due to the increased number of nodes, and in particular, in regard to collaboration, it may be desirable for a node to discover other nodes that the node can collaborate with to perform a task within the whole network without limitations brought by the isolation or segmentation mechanisms.

For example, a mobile AMR may operate in various locations within the designated environment to perform a task collaboratively with another AMR, and the collaboration may include the mobile AMR receiving a specific type of sensor data from another AMR. For this purpose, the mobile AMR may need to subscribe to a topic associated with a location of each other AMRs (i.e. every other AMR may publish their location with the topic) to locate the AMR with which the mobile AMR can collaborate based on its location and conditions of the collaboration. This approach may increase the density of the communication flow within the publish/subscribe network, considering the redundancy provided by the messages of all other AMR. In accordance with various aspects provided herein, it may be desirable, for a node in such a network of collaboration to obtain only discovery information of other nodes that the node can collaborate with to perform a task. In accordance with various aspects provided herein, the node may obtain discovery information of other nodes that the node can collaborate with based on collaboration information representing the conditions associated with the collaboration.

Figure 5:
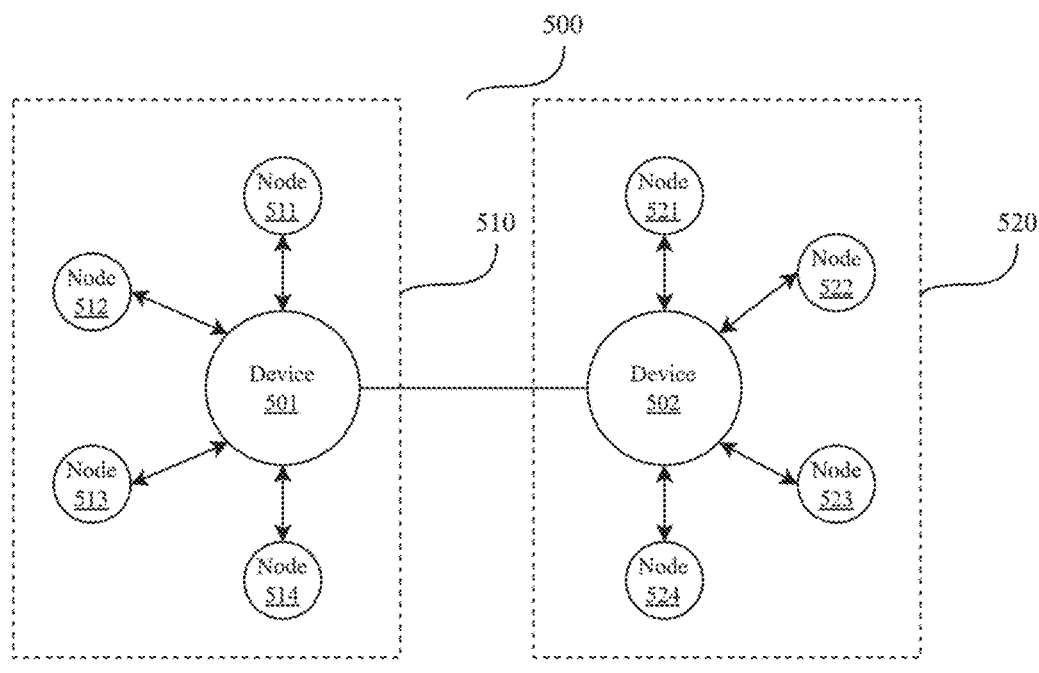
FIG. 5 shows an example representation of a centralized discovery architecture.

FIG. 5 shows an example representation of a centralized discovery architecture. Although the centralized discovery architecture illustrated herein is explained using methods associated with publish/subscribe networks, the architecture may apply to other messaging techniques, such as message queueing. In centralized discovery architectures, at least one node of the network 500 may undertake a server role that is configured to act as a hub for discovery information. In this illustrated example each of first server 501 (i.e. device undertaking a server role) and second server 502 is a discovery server configured to provide a discovery procedure in accordance with various aspects of this disclosure. In accordance with various aspects, each of first server 501 and second server 502 may be publish/subscribe broker itself.

In accordance with various aspects provided herein, each node 511, 512, 513, 514, 521, 522, 523, 524 of the network 500 may be associated with a software agent implemented by a device (e.g. a communication device including a processor), and some of the software agents may be implemented by the same device. As exemplary provided in various sections of this disclosure, a software agent may be an autonomous agent implemented by a processor of an autonomous machine, or a software agent may be a distributed agent implemented by a processor of a device (e.g. edge device, fog device, etc.). In various examples, each node may be a communication device configured to communicate using publish/subscribe pattern.

In this illustrated example, the network is segmented in clusters, and the first server 501 is configured to operate, in a first cluster 510, as a discovery server for a first group of nodes 511, 512, 513, 514. Similarly, the second server 502 is configured to operate, in a second cluster 520, as a discovery server for a second group of nodes 521, 522, 523, 524. In this illustrative example, the first server 501 may also be configured to operate as a client of the discovery server of the second cluster 520, and the second server 502 may also be configured to operate as a client of the first cluster 510.

Each device operating as discovery server 501, 502 for respective clusters 510, 520 may receive discovery information of the nodes that are members to the clusters 510, 520 respectively. Accordingly, the first server 501 may receive discovery information of the first group of nodes 511, 512, 513, 514 and the second server 502 may receive discovery information of the second group of nodes 521, 522, 523, 524. When a new participant (i.e. a new node) connects to one of the clusters, the new participant may announce its presence to the respective cluster and may exchange messages with the respective discovery server. Accordingly, the new participant may receive messages including discovery information of the nodes within the respective cluster from the respective discovery server.

In accordance with various aspects provided herein, discovery information associated with a participant may include information indicating or representing an identifier of the respective participant (e.g. a globally unique identifier (GUID)), an address required to communicate with the participant (e.g. transport locators, an internet protocol (IP) address, port numbers, etc.), quality of service (QoS) policies of the participant, topics in which the participant publishes, endpoint information including topics to which the participant subscribes, services which the participant, etc.

The network may be a publish/subscribe-based communication network, of which the details with respect to sending or receiving messages are provided in accordance with FIG. 4. The servers 501, 502 may exchange messages with the nodes 511, 512, 513, 514, 521, 522, 523, 524 of their respective clusters through designated (predefined) topics that are associated with the discovery, exemplarily by using the respective reader and writer units.

In this illustrative example, the first server 501 may obtain discovery information of each of the nodes 511, 512, 513, 514 of the first cluster 510. In order to obtain discovery information, the first server 501 may include a memory that is configured to store received discovery messages, or the first server 501 may access to discovery information of each of the nodes 511, 512, 513, 514 stored on the GDS. As the network is segmented in clusters, the first server 501 may obtain discovery information of each of the nodes 521, 522, 523, 524 of the second cluster 520 by exchanging messages with the second server 502 to receive discovery information of nodes of the second cluster. The first server 501 and the second server 502 may be configured to exchange messages using the publish/subscribe pattern or via another method (e.g. message queueing).

In accordance with various aspects provided herein, a node may be configured to provide one more services, some of which may be used to perform a task collaboratively with services provided by one or more further nodes. An agent, or an orchestrator of an agent, may describe each service with its associated service descriptions including attributes such as information about input (e.g. input data) of the service (i.e. the input the service may receive to provide the service, input parameters, etc.), information about the output (e.g. output data) of the service, information about the type of the service or the type of the entity that provides the service, information about the constraints or limitations of the service, in particular general constraints (e.g. required inputs to perform the service, constraints associated with type of the entity that performs the service), communication constraints (e.g. data rate, communication type), location constraints (e.g. whether the service is a mobile or stationary, location of the devices that performs the service and/or a range that the service can be provided), resource constraints (available resources to perform the service, availability associated with the service), etc., some of which are contextual.

In accordance with various aspects provided herein, a discovery server (e.g. the server 501, 502) may obtain the context information associated with attributes of the services provided herein (e.g. may be provided in service descriptions), that each 511, 512, 513, 514, 521, 522, 523, 524 is able to provide periodically (or based on use cases aperiodically). In various examples, the discovery server may store the context information of the nodes 511, 512, 513, 514, 521, 522, 523, 524 in a memory. In accordance with various aspects provided herein, the discovery server may receive a collaboration request representing that one of the nodes 511, 512, 513, 514, 521, 522, 523, 524 seeks a collaboration to perform a task with certain conditions and the discovery server may send discovery information of one or more of the nodes 511, 512, 513, 514, 521, 522, 523, 524 that meets the conditions of the collaboration.

Figure 6:
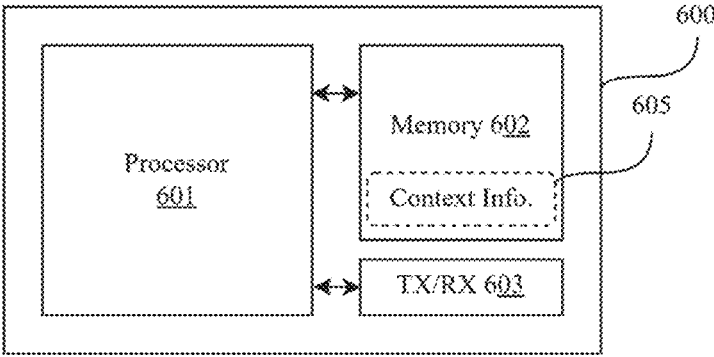
FIG. 6 shows an example of a device.

FIG. 6 shows an example of a device 600 according to various examples in this disclosure. The device 600 is depicted as a communication device (e.g. the communication device 200) in this illustrative example, including a processor 601, a memory 602, and a communication interface 603 (i.e. a transceiver, such as a wireless RF transceiver, wired transceiver, etc.). The communication interface 603 may be configured to perform communication operations according to any one of the communication technologies, some of which are mentioned within this disclosure. Various aspects of the device 600 are explained with an example that the device 600 is a device of a discovery server (e.g. the server 501, 502) configured to operate in a communication network including collaborating entities as nodes. The device 600 may be communicatively coupled to another device (e.g. another discovery server) that is configured to perform operations similar to the device 600. The device 600 may be a radio communication device configured to receive and transmit radio communication signals using an antenna element and accordingly the communication interface 603 may include one or more antenna elements that are configured to receive and transmit radio communication signals. In various examples, the communication interface 603 may be configured to perform wired communication operations (e.g. LAN), and the device 600 may further include an interface (e.g. a port, a socket) to receive and transmit communication signals via the communication interface 603.

The processor 601 may include one or more processors which may include a baseband processor and an application processor. In various examples, the processor 601 may include a central processing unit, a graphics processing unit, a hardware acceleration unit, a neuromorphic chip, and/or a controller. The processor 601 may be implemented in one processing unit, e.g. a system on chip (SOC), or a processor. In accordance with various examples, the processor 601 may further provide further functions to operate as provided within this disclosure, in particular for the aspects associated with a discovery server. The memory 602 may store various types of information required for the processor 601, or the communication interface 603 to operate in accordance with various aspects of this disclosure.

The processor 601 may obtain context information of a plurality of nodes within the network, wherein each node is configured to communicate according to a publish/subscribe pattern. Context information of a node may include information representing attributes associated with services that the node provides, or is able to provide. In various examples, the services may include services that the node is able to provide for collaboration with a further node of the network. In various examples, the processor 601 may be configured to perform communication operations for publish/subscribe-based communication, as exemplarily provided with respect to FIG. 4 within this disclosure, to obtain context information of each node from the respective node or from another discovery server may communicate with the respective node.

In accordance with various aspects provided herein, the device 600 may be configured to store the context information of the plurality of nodes into a memory, which can be a memory that is external to the device 600 (e.g. in another entity that is communicatively coupled to the device 600). In this illustrative example, the memory 602 of the device 600 may be configured to store context information 605 of the plurality of nodes. The context information 605 of each node may include information representing various attributes associated with the services that the respective node is able to provide, as disclosed herein. In various examples, the memory 602 may further be configured to store discovery information of at least some of the nodes, as disclosed herein.

The device 600 may further be configured to receive collaboration requests of a node of the communication network using the communication interface 603, representing, or indicating, that the node (i.e. requester node) requests to collaborate with another node of the communication network to perform a task by collaborating with the another node. A received collaboration request may include information representing the conditions of the collaboration, such as the task to be performed, services that are sought to perform the task, input conditions representing the data that the node can provide as an input to another node (e.g. input parameters, input data structure, etc.), output conditions representing the data the node can receive as an output of another node (e.g. output parameters, output data structure), location conditions representing circumstances or factors related to the location that the task may be performed, communication conditions representing circumstances or factors related to the communication procedure to perform the task, resource conditions representing circumstances or factors related to the resources (e.g. computation resources) to perform the task, etc.

In accordance with various aspects of this disclosure, information indicating or representing a collaboration condition may be information about a parametrical representation associated with the condition that may include parameters defining a value, a range, a mapping operation, a mathematical formula, vectors, matrices, etc. Similarly, the context information may include information about a parametrical representation associated with the context that the respective node is in, that may include parameters defining a value, a range, a mapping operation, a mathematical formula, vectors, matrices, etc.

In accordance with various aspects provided herein the device 600 may receive the collaboration request from a node that the device 600 may communicate with, or a node that the device 600 provides the discovery service. In certain examples, the node may be a node of a cluster that the device 600 operates in or provide discovery services to (e.g. that may sometimes be referred to as a local cluster). In various aspects, the device 600 may receive the collaboration request from a further discovery service that may provide discovery services for another cluster. A collaboration request received from a further discovery server may sometimes be referred to as inter-cluster collaboration request within this disclosure.

The processor 601 may be configured to determine one or more nodes of the plurality of nodes that meet the collaboration conditions received from the requester node based on the context information of the plurality of nodes. For this purpose, the processor 601 may search the memory 602 to identify the nodes of which the context information matches the collaboration conditions, and select the nodes of which the context information matches the collaboration conditions. The processor 601 may compare the parametrical representations associated with the collaboration conditions and the parametrical representations provided in the context information of each node to select the nodes. In accordance with various aspects provided herein, the processor 601 may perform the determination in response to the received collaboration request.

Furthermore, the processor 601 may obtain discovery information of the one or more nodes that the processor has determined that the one or more nodes meeting the collaboration conditions, the processor 601 may encode discovery information of the one or more nodes for transmission to the requester node. The discovery information may include information representing an attribute that the requester node may use to communicate with the determined one or more nodes according to the publish/subscribe pattern. Accordingly, the requester node may communicate with the determined one or more nodes to perform the task.

In accordance with various aspects provided herein, the communication between the device 600 and the nodes may be according to the publish/subscribe pattern. In various examples, while the processor 601 may subscribe the device 600 to a predefined topic associated with collaboration requests to receive collaboration requests and/or each node may be configured to publish to a predefined topic associated with context information to provide context information to the device 600. The communication interface 603 may transmit the encoded discovery information of the determined one or more nodes to the requester node via peer-to-peer (P2P) communication according to the discovery information of the requester node.

The processor 601 may control the communication interface 603 to receive communication signals including the context information and/or discovery information from the nodes periodically, or aperiodically. In the example of aperiodic reception, the processor 601 may control the communication interface 603 to communicate with the nodes or with another discovery server in response to a received collaboration request. In that example, the processor 601 may retrieve the context information and/or discovery information from the respective device and may update the context information and/or discovery information stored in the memory 602.

In accordance with various aspects provided herein, received context information may have various types. For example, a received context information may include a full reporting type context information including attributes associated with the services that the node may provide. The node may also be configured to send an incremental reporting type context information including only changed attributes associated with the services, as it may be desirable to reduce network overhead with incremental reporting. In such an example, the processor 601 may update the context information of the respective node stored in the memory 602 (e.g. by adjusting only the changed attributes). In various examples, the processor 601 may determine whether a received context information is of a full type or an incremental type based on an information in the received context information (e.g. a flag in the received message).

Figure 7:
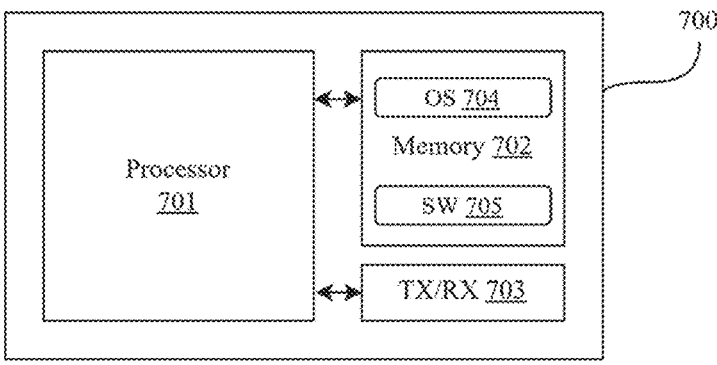
FIG. 7 shows an example of a node device as a node of a network.

FIG. 7 shows an example of a node device as a node of a network, in accordance with various aspects provided herein. The node device 700 is depicted as a general-purpose communication device (e.g. the communication device 200) in this illustrative example, including a processor 701, a memory 702, and a communication interface 703 (i.e. a transceiver, such as a wireless RF transceiver, wired transceiver, etc.). The communication interface 703 may be configured to perform communication operations according to any one of the communication technologies, some of which are mentioned within this disclosure. Various aspects of the node device 700 are explained with an example that the node device 700 is a device operating as a node of a network including other devices (may be referred to as other collaborative devices) that the device can collaborate with to perform a task. In order to perform an assigned task collaboratively, the node device 700 may communicate with the other collaborative devices that may be configured to perform operations similar to the node device 700. The node device 700 may be a radio communication device configured to receive and transmit radio communication signals using an antenna element and accordingly the communication interface 703 may include one or more antenna elements that are configured to receive and transmit radio communication signals. In various examples, the communication interface 703 may be configured to perform wired communication operations (e.g. LAN), and the node device 700 may further include an interface (e.g. a port, a socket) to receive and transmit communication signals via the communication interface 703.

The processor 701 may include one or more processors which may include a baseband processor and an application processor. In various examples, the processor 701 may include a central processing unit, a graphics processing unit, a hardware acceleration unit, a neuromorphic chip, and/or a controller. The processor 701 may be implemented in one processing unit, e.g. a system on chip (SOC), or a processor. In accordance with various examples, the processor 701 may further provide further functions to operate as provided herein, in particular for the aspects associated with the nodes of the network. The memory 702 may store various types of information required for the processor 701, or the communication interface 703 to operate in accordance with various aspects of this disclosure.

The memory 702 may be configured to store an operating system 704 to provide an interface between the processor 701, the memory 702, the communication interface 703, and further hardware components of the node device 700 with software agents 705. Furthermore, the memory 702 may be configured to store one or more software programs and/or modules including instructions, which when executed by the processor 701 to operate as a software agent 705 to perform a task collaboratively with another device. Each software agent 705 may cause the node device 700 to provide one or more services controlled by the software program. In various examples, each software agent 705 may include necessary instructions to cause the processor to perform as provided here for the aspects associated with task management and task performance.

Accordingly, in response to an assigned task, the node device 700 may provide one or more services as an output, as required to perform the task, in collaboration with another collaborative device. In order to perform the task, a service that the node device 700 provides may require a service from another collaborative device. For example, within the context of autonomous machines, another collaborative device may provide a service of bringing a workpiece to the node device 700, and once the node device 700 receives the workpiece, the node device 700 may provide a service of processing the workpiece. Within the context of distributed computation, another collaborative device may provide a service of providing sensor data to the node device 700, and once the node device 700 receives the sensor data, the node device 700 may provide a service of processing the sensor data. Similarly, another collaborative device may require a service of the node device 700 to provide its service. In another example, the node device 700 and another collaborative device may provide their services respectively, which may be independent from each other.

In accordance with various aspects provided herein, the node device 700 may communicate with another collaborative device for the purpose of performing the task collaboratively using publish/subscribe based communication, as exemplarily provided with respect to FIG. 4. Accordingly, the processor 701, the memory 702, and the communication interface 703 may be configured to perform operations to communicate with another collaborating device to send information to another collaborative device or receive information from another collaborative device.

In some aspects, the memory 702 may be configured to store a task database. Exemplary components of the task database may include task data, a task list, a task status, a task allocation, achievement parameters, target results, etc. Illustratively, the task database may provide and/or store information about a task which the device is affiliated, Some information of the task database (e.g., some task information) may be provided to the node device 700 by, e.g., other collaborative devices, and/or a central task controlling authority may provide the information of the task database. The node device 700 may provide some information of the task database (e.g., some task information), e.g., to one or more other members of a team, and/or other collaborating devices and/or to a central task controlling authority. The node device 700 may update and/or form some information of the task database (e.g., some task information), e.g., in accordance with a status of the task and/or based on other inputs and outputs associated with the software agents 705 or services provided by the software agents 705.

In accordance with various aspects provided herein, the processor 701 may determine a task to be performed and obtain task data associated with the task to be performed based on the task data base including task data associated with the task to be performed. In various examples, the node device 700 may receive an instruction via the communication interface 703 representing an assignment of a task to the node device 700, and optionally with the task data associated with the assigned task. In various examples, the task data may include information representing services required to perform the task. In various examples, the processor 701 may determine the services required to perform the task based on a task performance model. A task performance model may operate based on a policy. The task performance model may control the node device 700 to perform a task (i.e. task performance) based on the policy. The policy may include any type of information that may provide a guidance, which can be at various levels, to the task performance model to manage the one or more tasks. The policy may include a set of rules in a rule-based task performance model. The policy may include machine learning policies in a machine-learning based task performance model. In accordance with various aspects of this disclosure, the node device 700 may provide various task performances based on various policies.

The processor 701 may further obtain conditions and/or requirements, which will be referred to as conditions in this disclosure, associated with the collaboration with other collaborative devices to perform the task. The processor 701 may obtain the conditions based on the task data or as a part of the task performance model by determining the conditions based on one or more of the context of the device, conditions of the device, the task to be performed, and the task data.

In accordance with various aspects provided herein, the processor 701 may further generate context information representing various attributes associated with the services that the node device 700 may provide through the software agents. The attributes to be included within the context information may be preset by the software agent. For example, the software agent may include instructions to provide output (e.g. via APIs) representing the contextual situation associated with the software agent for the services that the software agent provides, which is accessible by the processor 701. In various examples, the processor 701 may generate the context information based on its operations, or information exchanged with one or more input/output devices (e.g. sensors, measurement circuits, etc.). The processor 701 may generate the context information periodically for the purpose of representing the context that the node device 700 is in, or the processor 701 may maintain the generated context information stored in the memory by updating periodically, or aperiodically based on attributes that changes.

The context information may include information representing at least one of a type or a role associated with the device or the software agent, a list of services that the node device 700 is able to perform (which may include input requirements (e.g. parameters, data structure, etc.) of each service and output of each service), tasks that are being performed by the node device 700, location of the node device 700 or location that the node device 700 may provide a service, a heading associated with the node device 700 representing a direction that the node device 700 moves, a velocity associated with the device available computing and/or communication resources of the node device 700, resource utilization status associated with the computing and/or communication resources of the node device 700, etc. The skilled person would appreciate that obtaining various information provided herein may require the node device 700 to include further components. In various examples, the node device 700 may further include a sensor interface, sensors, measurement circuits, a positioning unit (e.g. a global positioning system (GPS) unit), etc., that may be configured to operate according to known methods.

In various aspects provided herein, the processor 701 may encode the context information for transmission to a discovery server. The communication interface 703 may transmit the context information periodically, or aperiodically in response to a received request. In various examples, the processor 701 may be configured to encode a first type of context information (full-information) including a plurality of attributes and a second type of context information (incremental) including attributes that are changed relative to a previously encoded context information. In various examples, the encoding or the transmission of different types of context information may be based on different periods. Periodic encoding or periodic transmission of the first type of context information may be based on a first period and periodic encoding or periodic transmission of the second type of context information may be based on a second period. Furthermore, the processor 701 may be configured to encode discovery information and perform discovery procedure as a node, as exemplarily provided in accordance with FIG. 5.

Furthermore, the node device 700 may further be configured to send collaboration requests to another communication device (e.g. discovery server) of the communication network using the communication interface 703, in order to perform a task, representing, or indicating, that the node device 700 requests to collaborate with another node of the communication network to perform a task by collaborating with the another node. The collaboration request may include collaboration conditions, as provided within this disclosure.

Furthermore, the node device 700 may receive a response associated with the sent collaboration request from another communication device (e.g. discovery server) of the communication network using the communication interface 703. The response may include discovery information of one or more collaborative devices that the node device 700 may collaboratively perform the task. The discovery information may include an attribute required to communicate with the one or more collaborative devices, such as an identifier (e.g. GUID) of the collaborative devices, an address (e.g. an IP address) of the collaborative devices, and topics under which the node device 700 may communicate with each collaborative device, endpoint information related to endpoints (e.g. data reader unit, data writer unit) of each collaborative device to communicate based on publish/subscribe pattern. Accordingly, the node device 700 may configure a communication with at least one of the collaborative devices to provide a service to perform the task in collaboration with the respective collaborative device.

In various examples, the processor 701 may undertake a subscriber role in the network to subscribe to one of the topics that a collaborative device is configured to publish, or similarly, the processor 701 may undertake a publisher role in the network to publish to one of the topics that a collaborative device is subscribed to, based on the received discovery information. In various examples, the processor 701 may send IP unicast messages to the collaborative device to communicate according to the publish/subscribe pattern. In various examples, the processor 701 may configure the communication interface 703 to communicate with the respective collaborative device based on the discovery information received from the another communication that is the discovery server.

Figure 8:
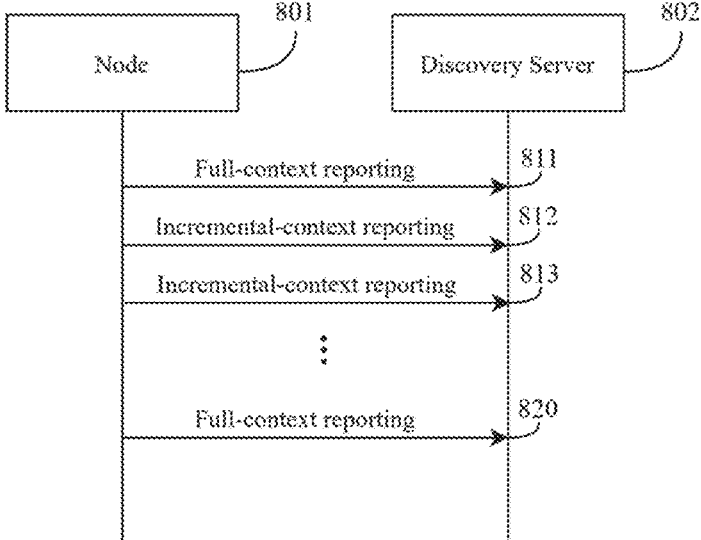
FIG. 8 shows an example representation of periodic context information reporting.

FIG. 8 shows an example representation of periodic context information reporting. In order to maintain determination by a discovery server based on up-to-date context information, a node 801 (e.g. the device 600) may send periodic reports 811, 812, 813, 820 to the discovery server 802, wherein each report may include one or more attributes associated with the services that the node 801 is able to provide. Each report 811, 812, 813, 820 may include information representing at least one of a type or a role associated with the node or the software agent, a list of services that the node is able to perform (which may include input requirements (e.g. parameters, data structure, etc.) of each service and output of each service), tasks that are being performed by the node, location of the node or location that the device node may provide a service, a heading associated with the node representing a direction that the node moves, a velocity associated with the device available computing and/or communication resources of the device, resource utilization status associated with the computing and/or communication resources of node, etc. A processor (e.g. the processor 700) of the node 801 may generate and/or encode each report for a transmission to the discovery server 802.

In accordance with various aspects provided herein, a report may further include discovery information of the respective node. The node may send reports having different types, as in a full context reporting 811, 820 including a plurality of attributes (e.g. all attributes) associated with the services and an incremental context-information second type of context information (incremental) including attributes that are changed relative to a previous report sent to the discovery server 802, or a predefined set of dynamic attributes associated with dynamic context information. In various examples, the encoding or the transmission of different types of reports may be based on different periods. Periodic encoding or periodic transmission of the first type of context information may be based on a first period and periodic encoding or periodic transmission of the second type of context information may be based on a second period.

In this illustrative example, the node 801 may send a full-context report 811 including discovery information of the node 801 and the first type of context information (full reporting) that may illustratively include information representing the type of the node 801 and a role associated with the node 801 with respect to the services provided by the node 801, available computation resources of the node 801, sensing capabilities and sensor configurations of the node 801, compute resource utilization status information representing a status of the computation resource utilized by the node 801, and information about the location of the node 801, such as location of the node 801, heading direction of the node 801, velocity of the node 801, etc.

After the node 801 sends the full context-report 811, the node 801 may send n number of incremental reports 812, 813 ($0<n<N$, n being an integer) periodically, between consecutive full reports 810, 820, according to a first period (T1) to the discovery server 802. In various examples, each incremental report 812, 813 may include only a predefined set of dynamic attributes or attributes that are changed after the latest report. According to the example provided, the processor of the node 801 may be configured to encode a first incremental report 812 including information representing a predefined set of dynamic attributes including compute resource utilization status information of the node 801, and information about the location of the node 801. Furthermore, the processor of the node 801 may identify that there are changes in previously reported sensing capabilities and sensor configuration information. Accordingly, the processor of the node 801 may include information representing changed sensing capabilities and sensor configuration information into the encoded first incremental report 812. The processor of the node 801 may encode further incremental reports in a similar manner.

In accordance with various aspects provided herein, the context information may include information about a parametrical representation associated with attributes, and accordingly at least some attributes provided in the reports may include parameters defining a value, a range, a mapping operation, a mathematical formula, vectors, matrices, etc. The processor of the node 801 may identify whether there are changes at an attribute reported by a previous report by comparing the current information associated with the attribute with previously reported information associated with the attribute. In various examples, the processor of the node 801 may determine to report the changes in a report based on a threshold parameter defined for the attribute. A previous report within this context may be any type of report that includes the attribute.

After the node 801 sends the n number of incremental reports 812, 813, the node 801 may send another full report 820 that includes the discovery information and information about the plurality of attributes to the discovery server 802. The node 801 may be configured to send full reports periodically according to a second period, wherein the second period is greater than the first period (T1) and/or greater than n*T1.

In accordance with various aspects provided herein, a discovery service (e.g. the device 600) may provide a context-based discovery of collaborative devices within networks, in which operations (for communication and/or for collaboration) are segmented into clusters. A network may include one or more discovery servers as provided herein, as standalone servers that may receive discovery information from respective nodes, or as a further discovery server that may be deployed with communicable state-of-the-art discovery servers to provide context-based discovery of collaborative devices Referring back to FIG. 5, where each server 501, 502, may include a device as provided with respect to FIG. 6 (i.e. the device 600), and where each node 511, 512, 513, 514, 521, 522, 523, 524 may include a device as provided with respect to FIG. 7 (i.e. the node device 700), the servers may provide discovery service as provided herein, for their respective clusters 510, 520. The first server 501 may provide discovery service for the nodes 511, 512, 513, 514 within the first cluster, and the second server 502 may provide discovery service for the nodes 521, 522, 523, 524.

Each server 501, 502 may also control access of nodes within the cluster with various access mechanisms based on the use of the discovery server. A processor (e.g. the processor 601) of a server may determine to incorporate a new node into the cluster that the server provides the discovery service based on one or more predefined criteria. For example, within the context of autonomous networks, the processor may determine to incorporate a new node into the respective cluster, based on received location information representing the location of the node, as it may be desirable to provide cluster segmentation per location. Similarly, within the context of distributed networks, the processor may determine to incorporate a new node into the respective cluster based on received resource information representing the available resources of the new node. Each node may access information (e.g. discovery information) representing attributes required to communicate with a discovery server via a local storage (e.g. the memory 702), or via an external storage the node may access and receive information. The information may further include one or more predefined criteria required to receive discovery service from the respective discovery server.

Each node may send its context information periodically to the server of the cluster that the node is included. In this illustrative example, nodes 511, 512, 513, 514 of the first cluster 510 may send respective context information periodically to the first server 501, and nodes 521, 522, 523, 524 of the second cluster 520 may send respective context information periodically to the second server 502. The first cluster 510 may be referred to as a local cluster for nodes 511, 512, 513, 514 and the first server 501. Similarly, the second cluster 520 may be referred to as a local cluster for nodes 521, 522, 523, 524 and the second server 502.

Each server 501, 502 may communicate with each other (and with other discovery servers within the network) via the exchange of inter-cluster messages, which may be exchanged in one example using a separate communication channel, that is separate from the communication channel that a server may use to exchange messages with the nodes of its clusters. Each server 501, 502 may provide discovery information of one or more the nodes of the respective cluster, or context information of one or more of the nodes of the respective cluster, so that other discovery servers may access the discovery information and/or context information of the nodes of further clusters.

Each server 501, 502 may accordingly update context information and/or discovery information stored in its memory for the nodes of its local cluster via information exchanged with the nodes of its local cluster, and for other nodes of further clusters via information exchanged with other discovery servers serving further clusters.

Within this illustrative example, the first server 501 may receive context information and discovery information of nodes 511, 512, 513, 514 by exchanging messages with nodes 511, 512, 513, 514, and the first server 501 may send context information and discovery information of nodes 511, 512, 513, 514 to the second server 502 periodically, or aperiodically in response to a received request from the second server, so that the second server 502 may access context information and discovery information of nodes 511, 512, 513, 514. Similarly, the first server 501 may receive context information and discovery information of nodes 521, 522, 523, 524 from the second server 502 performing operations similar to operations of the first server 501.

Within various aspects provided herein, when a server 501, 502 receives a collaboration request from its cluster, the server 501, 502 may provide discovery information and context information of other nodes in further clusters that further discovery servers may serve. For this purpose, the server 501, 502 may pass the collaboration request received from a node of the local cluster (or send an inter-cluster collaboration request based on the requested collaboration conditions) to further servers providing discovery service for further clusters, so that further servers may send information (e.g. discovery information and/or context information) about nodes within their clusters. A server 501, 502 may send such inter-collaboration messages to all further clusters within the network, or the server 501, 502 may select one or more clusters from all further clusters based on the received collaboration request and information that the server has about other nodes within all further clusters, as provided in various examples in this disclosure.

In various examples, a server 501, 502 may send cluster reports including information about its local cluster to further clusters periodically, or in response to a received request from further clusters. To minimize the inter-cluster traffic, the server may share only the aggregated information or the current bounds of specified key performance indicator (KPI) parameters. A cluster report may include general information about the cluster, such as the number of nodes operating in the cluster, node types or node roles within the cluster, aggregated information based on context information received from nodes, such as information about an attribute included in context information received from multiple nodes (e.g. an aggregated coverage area of sensors in the cluster, aggregated communication resources or computing resources of the cluster. In accordance with various aspects provided herein, the cluster report may also include a first type cluster report as a full report, and a second type cluster report as an incremental report, similar to the methods provided with respect to context reporting according to FIG. 8.

For this purpose, the processor of the server may be configured to aggregate information of one or more predefined attributes associated with multiple nodes from the context information of the multiple nodes (e.g. latest context information) to obtain the aggregated information to be included in the cluster report. Furthermore, the processor of the server may also obtain predefined KPI parameters based on the context information received from the nodes according to a KPI calculation model based on one or more parametrical attributes that the context information may include. The processor of the server may obtain the aggregated information and KPI parameters for each cluster report and may encode the cluster report based on the latest context information and/or discovery information.

In various examples, a node 511, 512, 513, 514 may send a resource status message to perform a query associated with the current status of collaboration resources (e.g. number of collaborative devices, a metric representing computation resources, or communication resources available to the clusters). The processor of the respective node 511, 512, 513, 514 may determine to generate a collaboration request based on the response to the query associated with the current status of collaboration resources received from the first server 501. In various examples, the first server 501 may provide a response to the query, and the response may include information representing available collaboration resources of the local cluster based on the context information received from the nodes 511, 512, 513, 514, and available collaboration resources of further clusters based on cluster reports received from further clusters.

Figure 9:
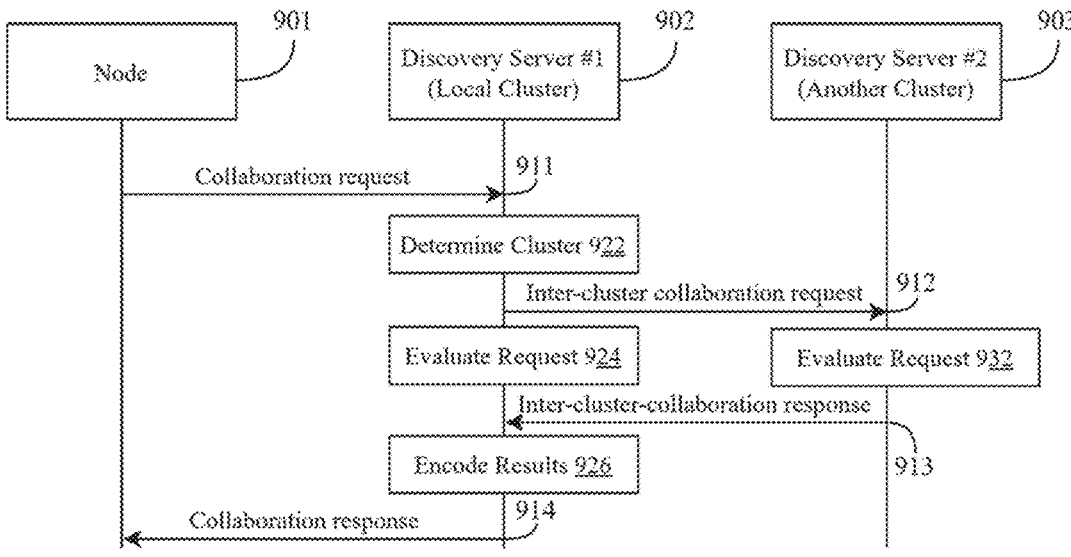
FIG. 9 shows an exemplary representation of collaboration request messaging.

FIG. 9 shows an exemplary representation of collaboration request messaging in accordance with various aspects provided in this disclosure. The illustrated example includes a requester node, a first discovery server as the discovery server for the local cluster of the requester node, and a second discovery server that is not in the local cluster of the requester node. A requester node 901 (e.g. the node device 700) may send a collaboration request 911 to a first discovery server 902 (e.g. the device 600) acting as a discovery server designated for the cluster of the requester node 901. The collaboration request 911 may indicate that the requester node 901 is searching for further nodes that the requester node 901 can collaborate with to perform a task. The collaboration request 911 may include collaboration conditions sought by the requester node 901. The first discovery server 902 may receive the collaboration request 911. In accordance with various aspects, the first discovery server 902 may initiate a discovery session associated with the collaboration request 911.

In a network having a plurality of clusters, the first discovery server 902 may determine 922 one or more clusters from the plurality of clusters based on the collaboration conditions associated with the request and based on the latest cluster reports of the plurality of clusters that may be stored in the memory of the first discovery server 902. In various examples, the processor of the first discovery server 902 may determine 922 clusters including nodes that meet the collaboration conditions using the latest cluster reports. In various examples, the processor of the first discovery server 902 may estimate 922 clusters including nodes that may meet the collaboration conditions using any known model. In parallel to the disclosure provided herein with respect to FIG. 6 about the determination of nodes, the processor of the server may perform a similar selection mechanism to select 922 one or more clusters from the plurality of clusters based on parametrically represented cluster reports.

In accordance with various aspects provided herein, each discovery server may also establish a policy associated with an inter-cluster collaboration mechanism based on utilization, occupancy, or availability of resources for the purpose of balancing utilization, occupancy, or availability of resources among all clusters in the network. The established policy may cause servers to prioritize or exclude further clusters for the selection procedure associated with the inter-cluster collaboration. For this purpose, the processor of the first discovery server 902 may further determine the one or more clusters from the plurality of clusters based on policy parameters stored in the memory and the cluster reports received from the plurality of clusters.

For example, the processor of the first discovery server 902 may initially determine candidate clusters from the plurality of clusters as a first step based on the collaboration conditions associated with the request of the requester node 901 and the cluster reports associated with clusters within the network. Accordingly, the determined candidate clusters may include all clusters in the network that are determined to meet the collaboration conditions. Furthermore, the processor of the first discovery server 902 may select some of the candidate clusters as the determined one or more clusters based on the preset policy parameters. For example, the determined one or more clusters may include a predefined n number of clusters that are the first n clusters that have the most available resources among the candidate clusters, or that have the least occupied resources among the candidate clusters, or that have the least utilized resources among the candidate clusters. These are however examples, and any known method of resource-based selection mechanism may be used to optimize the resources of clusters within the network. In various examples, the processor of the first discovery server 902 may perform the selection from the candidate clusters based on a resource parameter (e.g. occupancy, utilization, availability) and a predefined threshold associated with the resource parameter.

Based on the determined one or more clusters (or without any determination or selection of all clusters), the first discovery server 902 may encode inter-cluster collaboration request message 912 including information representing the collaboration conditions, and send the inter-cluster collaboration request message 912 to a second discovery server 903 (e.g. the device 600).

The second discovery server 903 (and further discovery servers) may receive the inter-cluster collaboration request message 912 including information representing the collaboration conditions. In accordance with various aspects, the second discovery server 903 may also initiate a discovery session associated with the received inter-cluster collaboration request message 912. In response to the received inter-cluster collaboration request message 912, the processor of the second discovery server 903 may be configured to perform the search within its local cluster. Accordingly, the processor of the second discovery server may determine 932 one or more nodes of a plurality of nodes within the local cluster of the second discovery server 903 based on context information received from the plurality of nodes within the local cluster of the second discovery server 903, in accordance with various aspects provided herein. Accordingly, the second discovery server 903 may encode an inter-cluster collaboration response message 913 including context information and discovery information of the determined one or more of its local cluster for a transmission to the first discovery server 902 and send the inter-cluster collaboration response message 913 to the first discovery server 902. In accordance with various aspects, the second discovery server 903 may finalize the initiated discovery session associated with the inter-cluster collaboration request message 912.

The first discovery server 902 may further determine 924 one or more nodes of the plurality of nodes within the local cluster of the first discovery server 903 based on context information received from the plurality of nodes within its local cluster, in accordance with various aspects provided herein. Furthermore, the processor of the first discovery server 902 may receive the inter-cluster collaboration response message 913 from the second discovery server 903, and accordingly the first discovery server 902 may obtain discovery information (and optionally the context information) of the one or more nodes that the second discovery server (and further servers for further clusters) has determined from its local cluster based on the collaboration conditions. The processor of the first discovery server 902 may encode 926 a collaboration response for a transmission to the requester node 901, and the collaboration response 914 may include discovery information of the one or more nodes of the local cluster of the first discovery server 902 and the one or more nodes of further clusters (e.g. the local cluster) that are determined that they meet the collaboration conditions. In accordance with various aspects, the first discovery server 902 may finalize the initiated discovery session associated with the collaboration request message 911.

The requester node 901 may accordingly receive the collaboration response 904 discovery information (and optionally context information) of nodes within the whole network in various clusters, the nodes that meet the collaboration conditions requested by the requester node. In order to perform a collaboration with one or more nodes (a target node) from the nodes that the collaboration response message 914 indicates, the processor of the requester node 901 may configure a communication according to the publish/subscribe pattern supported by the network based on the discovery information. The processor of the requester node 901 may undertake a publisher node to publish in a topic that a target node has subscribed to, or may undertake a subscriber node to subscribe to a topic that a target node is configured to publish to, or may send IP unicast messages to a target node.

In a dynamic environment, the context of nodes and clusters can change dynamically. There may be various types of changes associated with the context of nodes and clusters, such as new nodes may join a cluster or existing nodes may leave a cluster, the locations of nodes/sensors can change due to mobility, the resource utilization in terms of computing and/or communication resources may change, and such. It may be desirable to adapt the collaboration state of a node with changes in the environment. Accordingly, subscription-based collaboration information sharing may be used. For example, a node may subscribe with discovery information to receive information related to a set of conditions.

In accordance with various aspects of this disclosure, the first discovery server 902 and/or the second discovery server 903 may not finalize the respective discovery sessions associated with received requests respectively, and keep the associated sessions for a predefined period of time, or until a further received message representing the end of the respective session. For example, the collaboration request message 911 may include information representing whether the requester node wants to subscribe to receive information about changes in the network with respect to the requested collaboration conditions. Accordingly, the first discovery server 902 and/or the second discovery server 903 may not finalize the respective discovery sessions associated with received requests respectively as disclosed herein, and keep the associated sessions for a predefined period of time which, in an example, the collaboration request message 911 may include information representing the predefined period of time, or until a further received message representing the end of the respective session.

In such an example, the processor of the second discovery server 903 may, after sending inter-cluster collaboration response message 913, keep the discovery session active, and provide further inter-cluster collaboration response messages (not shown) periodically, or aperiodically in response to a detection of a change within its local cluster, which the change is related to the received collaboration conditions with the to the inter-cluster collaboration request message 912, until the discovery session is finalized. In particular, the second discovery server 903 may send further inter-cluster collaboration response messages to the first discovery server, if a new node becomes eligible to satisfy collaboration requirements, or if a previously reported node becomes ineligible due to changes in its context.

For this purpose, the second discovery server 903 may store session information including at least one of: i) the collaboration conditions, ii) the context information of the selected nodes within the local cluster, which the processor of the second discovery server 903 has used to make the determination of the determined one or more nodes, and iii) the discovery information of the determined one or more nodes that the second discovery server 903 has sent with the inter-cluster collaboration response message 913 in the memory. The second discovery server 903 may detect the changes based on the stored session information and further context information and further discovery information received from the nodes of its cluster during its operation, and send further inter-cluster collaboration response messages to the first discovery server 902 as long as the discovery session is active.

Similarly, the processor of the first discovery server 902 may, after sending the collaboration response message 914, keep the discovery session active, and provide further collaboration response messages (not shown) periodically, or aperiodically in response to a detection of a change within its local cluster or received messages from further clusters (e.g. the second discovery server 903), which the change is related to the received collaboration conditions with the to the collaboration request message 912, until the discovery session is finalized. In particular, the first discovery server 902 may send further collaboration response messages to the requester node 901, if a new node becomes eligible to satisfy collaboration requirements within the local cluster of the first discovery server 902 or within further clusters based on received further inter-cluster collaboration response messages, or if a previously reported node becomes ineligible due to changes in its context within the local cluster of the first discovery server 902, or within further clusters based on received further inter-cluster collaboration response messages.

For this purpose, the first discovery server 903 may store session information including at least one of: i) the collaboration conditions, ii) the context information of the selected nodes within the local cluster, which the processor of the first discovery server 902 has used to make the determination of the determined one or more nodes, and iii) the discovery information of the determined one or more nodes that the first discovery server 902 has sent with the collaboration response message 914 in the memory. The first discovery server 902 may detect the changes based on the stored session information and further context information and further discovery information received from the nodes of its cluster during its operation and send further collaboration response messages to the requester node 901 as long as the discovery session is active.

Furthermore, the first discovery server 902 may obtain detected changes received from further clusters based on received further inter-cluster collaboration messages and send discovery information and optionally the context information of nodes associated with the detected changes, which the received further inter-cluster collaboration messages include, to the requester node 901 as long as the discovery session is active. In accordance with various aspects provided herein, the further collaboration response messages may be referred to as, or may include, eligibility messages representing that a newly incorporated node meets the collaboration conditions. In accordance with various aspects provided herein, further collaboration response messages may be referred to as, or may include ineligibility messages representing that a previously reported node does not meet the collaboration conditions anymore.

Figure 10:
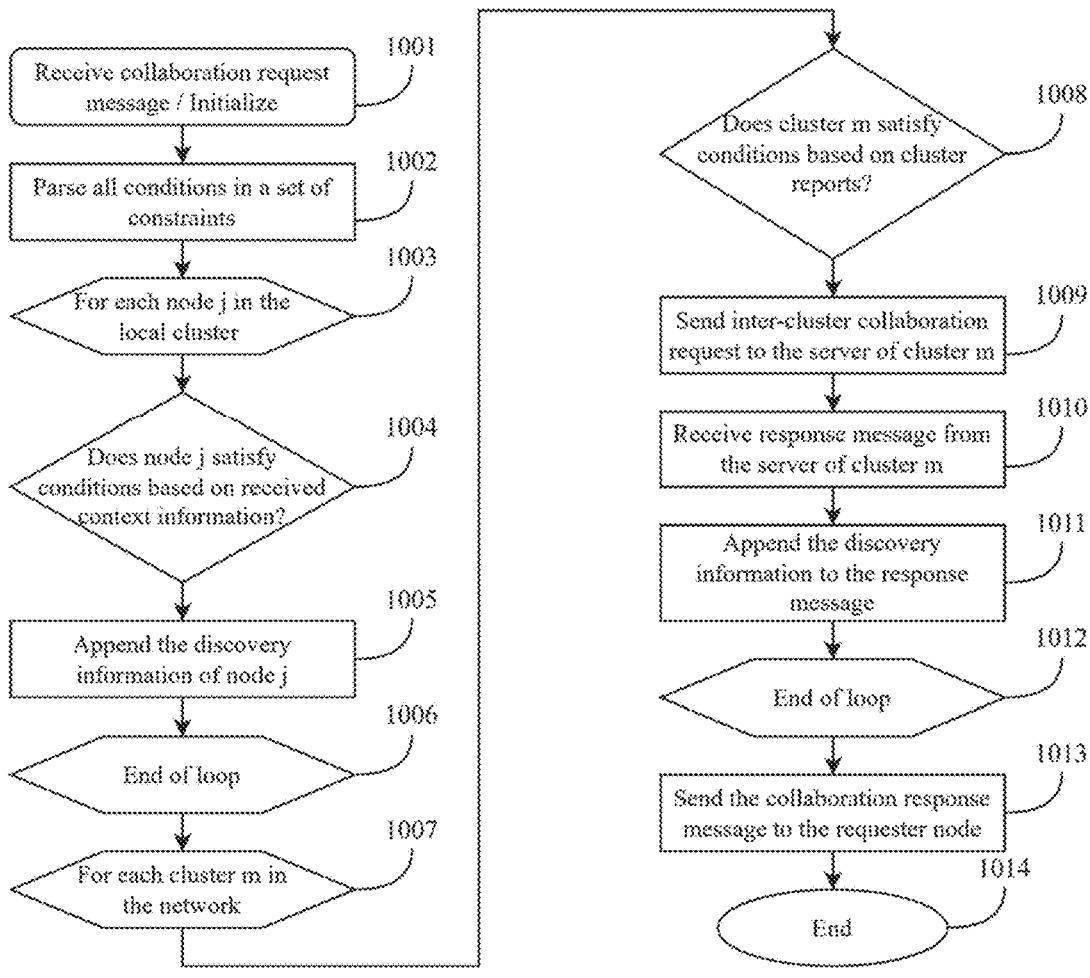
FIG. 10 shows an exemplary flow diagram of a discovery procedure.

FIG. 10 shows an exemplary flow diagram of a discovery procedure in accordance with various aspects of this disclosure. A discovery server (e.g. the device 600) including a processor (e.g. the processor 601), a memory (e.g. the memory 602), and a communication interface (e.g. the communication interface 603) may perform the illustrated discovery procedure to provide discovery service for nodes of its local cluster. The processor may initiate 1001 the procedure in response to a collaboration request message received from a requester node. The processor may initiate a discovery session associated with the collaboration request of the requester node, which may be finalized by providing a collaboration response message to the requester node.

The processor may then parse 1002 all conditions of the requested collaboration into a set of constraints representing the limitations and requirements associated with the discovery session. The collaboration conditions may include one or more parameters associated with each attribute wherein the one or more parameters for each attribute may represent a limitation or a requirement associated with the attribute. The processor may further associate or map information provided that associates with an attribute a value, a range, a mapping operation, a mathematical formula, vectors, matrices, based on the one or more parameters, etc.

Then, for the local cluster including J number of nodes, for 1003 each node j of the local cluster, j being a node index, the processor may determine whether 1004 node j satisfies the collaboration conditions, or not, based on the context information of the node j. As the context information may include information about a parametrical representation associated with the context that the node j is in (or was in according to the latest update of the context information stored in the memory), the processor may determine whether one or more parameters provided within the context information for an attribute is within the limitations or meet the requirements that the one or more parameters for the respective attribute of the collaboration conditions.

If the processor determines that a node j meets the collaboration conditions parsed in the set of constraints, the processor may assign 1005, for each node j that meets the collaboration conditions, and the discovery information of the node j to be reported to the requester node. For this purpose, the memory may be configured to store a list of nodes and optionally discovery information and/or context information of nodes that the processor selects as to be reported to the requester nodes for each discovery session. In this example, the processor may control the memory to store an identifier of node j, or discovery information of node j within the memory. In this illustrative example, the processor may append the discovery information of the node j, for each node j that meets the collaboration conditions, into the response message to be sent to the requester node. Otherwise, the loop moves to a next node. The loop associated with local cluster nodes ends 1006 when j=J, if the j was initialized with 1.

Furthermore, in case the requester node is not a discovery server but a node of the local cluster as provided in this illustrative example, having M number of further clusters that the server may communicate, for 1007 each cluster m, m being an index of the further clusters, the processor may determine whether 1008 cluster m satisfies the collaboration conditions or not, based on the cluster report of the cluster m. As the cluster report may include information of a parametrical representation associated with the context that the nodes of the cluster m in (or was in according to the latest update of the cluster report stored in the memory), the processor may determine whether one or more parameters provided within the cluster report for an attribute is within the limitations or meet the requirements that the one or more parameters for the respective attribute of the collaboration conditions.

If the processor determines 1009 that a cluster m meets the collaboration conditions parsed in the set of constraints, for each cluster m meeting the collaboration conditions, the processor may send 1009 an inter-cluster collaboration request to a discovery server of the cluster m, so that discovery server of the cluster m may perform similar determinations as provided for nodes of the local cluster to determine nodes that meets the collaboration conditions within its local cluster. The discovery server may then receive 1010 an inter-collaboration response message from the discovery server of the cluster m, for each cluster m meeting the collaboration conditions, including discovery information and optionally context information of nodes meeting the collaboration conditions within cluster m. For each cluster m, the processor may append 1011 discovery information (and optionally context information) of nodes provided in the inter-collaboration response message of cluster m into the response message to be sent to the requester node. Otherwise, the loop moves to a next cluster. The loop associated with further clusters ends 1012 when m=M, if the m was initialized with 1.

Furthermore, the processor may control the transceiver to send 1013 collaboration response message after all iterations provided here are complete. The processor may finalize the discovery session associated with the collaboration request. Accordingly, the collaboration response message may include information of one or more nodes of the local cluster and one or more nodes of further clusters, where each node meets the collaboration conditions. In various examples, the requester node may further apply a selection based on its task performance model and communicate with some of the nodes provided with the collaboration response message to initiate a collaboration with some of the nodes respectively.

Figure 11:
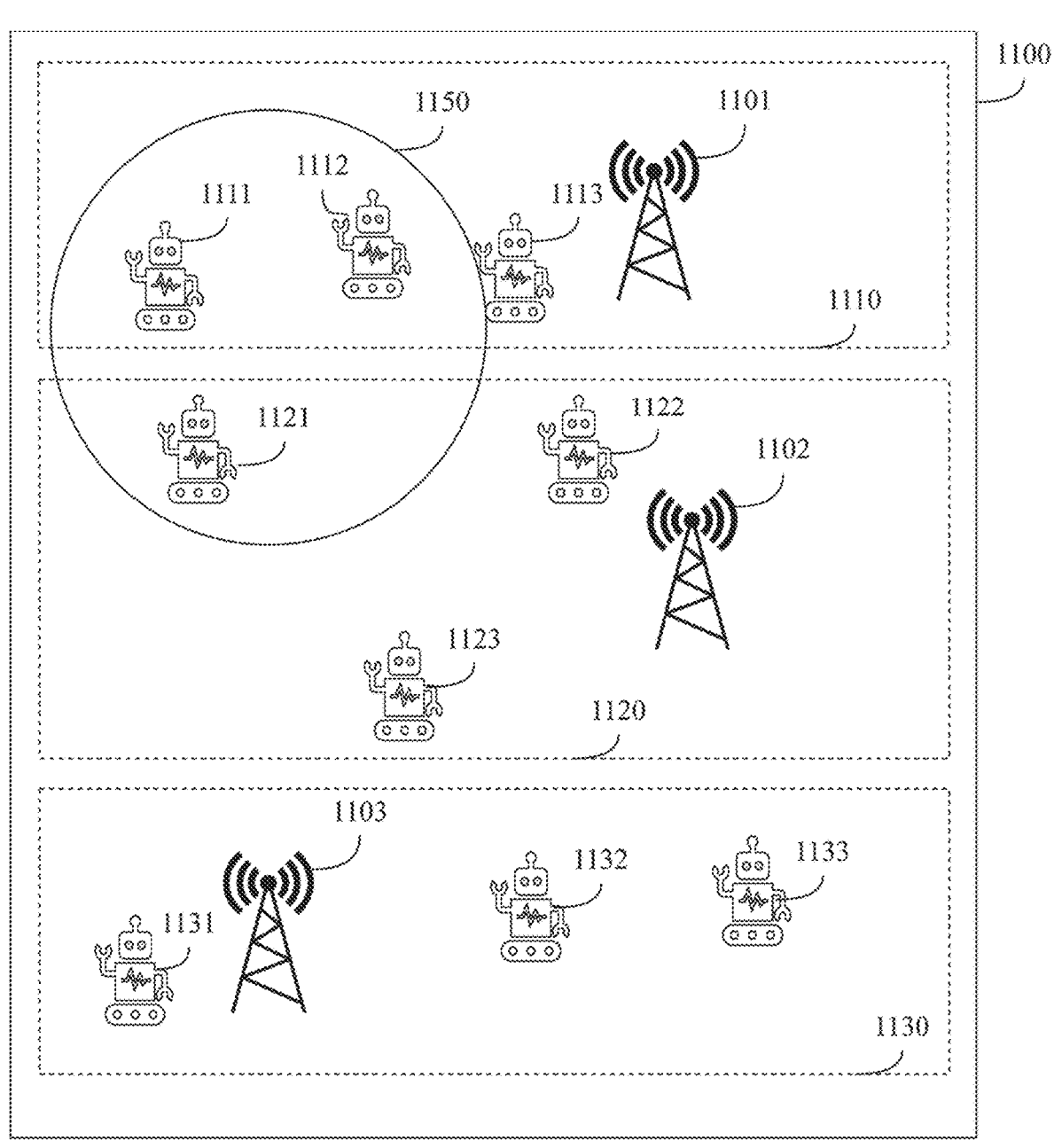
FIG. 11 shows an exemplary illustration of an environment including devices operating with a collaborative network using publish/subscribe-based communication.

FIG. 11 shows an exemplary illustration of an environment including devices operating with a collaborative network using publish/subscribe-based communication. The illustrative example is provided as a discovery procedure within the context of autonomous networks including autonomous machines as devices including agents. The illustrative example intends to disclose various aspects provided in this disclosure according to the context of autonomous agents. The skilled person would recognize the teachings that may apply to other agents.

In this illustrative example, an autonomous agent environment 1100 (e.g. a factory, a warehouse, etc.) is depicted, including AMRs 1111, 1112, 1113, 1121, 1122, 1123, 1131, 1132, 1133 configured operate agents to provide various services and perform a task collaboratively with one or more other AMRs. Entities in the environment 1100 (e.g. AMRs 1111, 1112, 1113, 1121, 1122, 1123, 1131, 1132, 1133) are configured to communicate using the publish/subscribe pattern. In order to provide segmentation, the environment is segmented according to locations in a first cluster 1110, a second cluster 1120, and a third cluster 1130. In this instance, a first discovery server 1101 is configured to provide a discovery service for AMRs 1111, 1112, 1113 of the first cluster 1110, a second discovery server 1102 is configured to provide a discovery service for AMRs 1121, 1122, 1123 of the second cluster 1120, and a third discovery server 1103 is configured to provide a discovery service for AMRs 1131, 1132, 1133 of the third cluster 1130.

In this illustrative example, each AMR 1111, 1112, 1113, 1121, 1122, 1123, 1131, 1132, 1133 may be associated with a node (e.g. the node device 700) of the network as provided in various aspects of this disclosure, and each discovery server 1101, 1102, 1103 may be associated with a discovery server (e.g. the device 600) of the network as provided in various aspects of this disclosure. Accordingly, each discovery server 1101, 1102, 1103, may receive context information and discovery information from AMRs 1111, 1112, 1113, 1121, 1122, 1123, 1131, 1132, 1133 of its cluster respectively. Furthermore, discovery servers 1101, 1102, 1103 may exchange messages to obtain cluster reports. Each discovery server may store received context information, discovery information, and cluster reports in their memory as a discovery database, or each discovery server may provide this information to a further device including a memory configured to store such a discovery database.

In this illustrative example, AMR 1123 may receive an instruction to perform a task. Accordingly, AMR 1123 may identify one or more services that are required to perform the task, which the identified one or more services are to be consumed by AMR 1123 (i.e. another entity provides the one or more services, or a portion of them) to perform the task. Assuming that AMR 1123 has identified that the task requires a specific 3D perception and AMR 1123 has accordingly identified that AMR 1123 needs to consume a service that provides specific 3D sensor data to AMR 1123, where the specific 3D sensor data is sensor data of a red green blue—depth (RGBD) sensor. AMR 1123 further identifies that the task involves storage of a workpiece to a designated location. Accordingly, AMR 1123 determines area 1150 as the location of the service.

As currently, AMR 1123 operates within the second cluster 1120, AMR 1123 may encode a collaboration request to transmit to the second discovery server 1102. The collaboration request may include conditions of the collaboration, such as information representing the service to be consumed (e.g. an indicator that the service involves receiving 3D sensor data), information representing the type of the 3D sensor (e.g. an indicator that an RGBD sensor is required), information representing further attributes of the 3D sensor (e.g. a minimum resolution, minimum horizontal field of view, minimum vertical field of view), type of the device providing the service (e.g. an indicator of a collaboration with an AMR), information representing attributes associated with resources (e.g. minimum computation capabilities, a particular processor type (e.g. an accelerator), availability of various libraries, resource availability, etc.). Each information exemplified herein may correspond to an attribute and may be represented by one or more parameters. The collaboration request may include one or more parameters for each information exemplified here.

The second discovery server 1102 receives the collaboration request and the processor of the second discovery server 1102 may determine which further discovery servers are to be involved with the discovery session associated with the collaboration request. The processor of the second discovery server 1102 may identify, based on information including cluster reports received from the third discovery server 1103 and the received collaboration request, that none of AMRs 1131, 1132, 1133 is (or is eligible to be) in the designated area 1150 which the collaboration request includes as one of the collaboration conditions. Accordingly, the processor of the second discovery server 1102 may determine not to send any inter-cluster collaboration request to the third discovery server 1103.

Furthermore, the processor of the second discovery server 1102 may determine, based on information including cluster reports received from the first discovery server 1101 and the received collaboration request, that the first cluster 1101 was deployed in a manner covering a portion of the designated area, and there may be AMRs located or locatable within the designated area. The processor of the second discovery server 1102 may also determine that the first cluster 1101 may include AMRs that meet the collaboration conditions (e.g. cluster report of the first cluster 1101 may include, exemplarily, that there are AMRs that may provide a service including provision of 3D sensor data, there are AMRs with RGB-D sensors, etc. for all collaboration conditions). Accordingly, the second discovery server 1102 may send an inter-cluster collaboration request to the first discovery server 1101.

The first discovery server 1101 may receive the inter-cluster collaboration request and may determine, based on collaboration conditions received with the received inter-cluster collaboration message and context information of AMRs 1111, 1112, 1113, that both AMR 1111 and AMR 1112 meet the collaboration conditions. Accordingly, the first discovery server 1101 may send an inter-cluster collaboration response to the second discovery server 1102. The inter-cluster collaboration response may include the context information of AMRs 1111, 1112 and the discovery information of AMRs 1111, 1112.

The second discovery server 1101 may also determine, based on collaboration conditions received from AMR 1123 and context information of AMRs 1121, 1122, 1123, that AMR 1121 meets the collaboration conditions. Accordingly, the second discovery server 1101 may encode a collaboration response message and send the collaboration response message to AMR 1123. The collaboration response message may include context information and discovery information of AMRs 1111, 1112, 1121.

Therefore, AMR 1123 receives the discovery information and context information of further AMRs that the AMR 1123 may collaborate with, by at least consuming the service provided with one of AMRs 1111, 1112, 1121, which the service may include providing RGB-D sensor data to AMR 1123, to perform the task. AMR 1123 may, based on received discovery information, communicate with at least one of AMRs 1111, 1112, 1121 to exchange information to perform the task.

Figure 12:
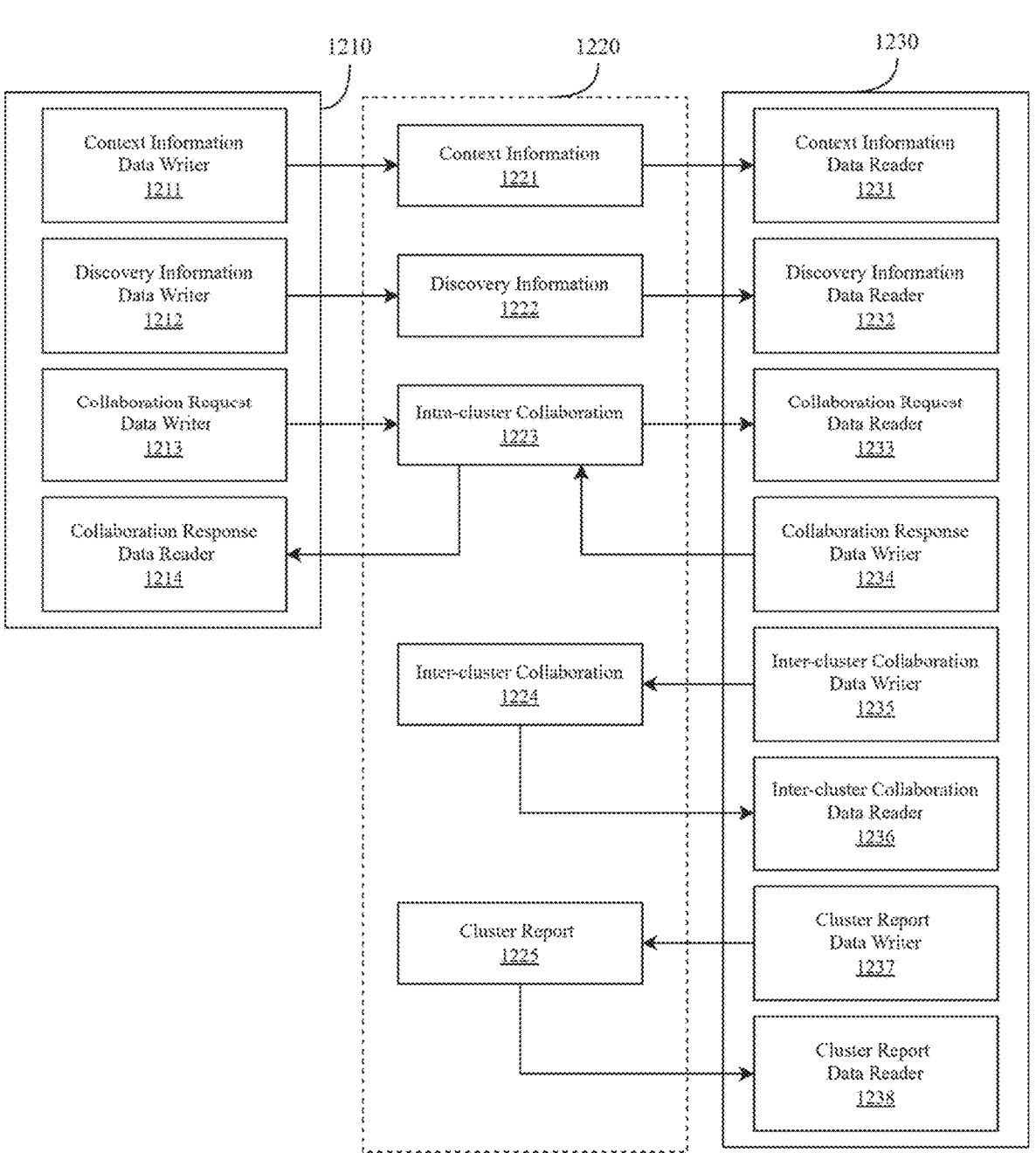
FIG. 12 shows an exemplary representation of endpoints to provide communication associated with a discovery procedure.

FIG. 12 shows an exemplary representation of endpoints to provide communication associated with a discovery procedure in accordance with various aspects of this disclosure, in particular various aspects with respect to a broker-less publish/subscribe architecture as discussed according to FIG. 4. In accordance with various aspects provided herein associated with a discovery procedure using publish/subscribe communication, exemplary associated endpoints are provided for a node device 1210 (e.g. the node device 700) operating as a node of the network, and for a discovery server 1230 (e.g. the device 600), to exchange messages in various topics 1220.

The node device 1210 may include a first data writer unit 1211, for sending context information, to publish to a first topic 1221 associated with context information, a second data writer unit 1212, for sending discovery information, to publish to a second topic 1222 associated with discovery information, a third data writer unit 1213, for sending collaboration requests, to publish to a third topic 1223 associated with intra-cluster collaboration messages, a first data reader unit 1214, for receiving collaboration responses, to subscribe to the third topic 1223 associated with intra-cluster collaboration messages.

The discovery server 1230 may include a first data reader unit 1231, for receiving context information, to subscribe to the first topic 1221 associated with context information, a second data reader unit 1232, for receiving discovery information, to subscribe to the second topic 1222 associated with discovery information, a third data reader unit 1233, for receiving collaboration requests, to subscribe to the third topic 1223 associated with intra-cluster collaboration messages, a first writer reader unit 1234, for sending collaboration responses, to publish to the third topic 1223 associated with intra-cluster collaboration messages.

Accordingly, each node within the local cluster of the discovery server 1230 may be configured to publish and subscribe topics as the node device 1210. Accordingly, the discovery server 1230 may receive context information of each node within the local cluster with its first data reader 1231, discovery information of each node within the local cluster with its second data reader 1232, collaboration requests of each node within the local cluster with its third data reader 1233. The discovery server 1230 may send collaboration responses to every node within the local cluster with its first data writer 1234.

Furthermore, in order to provide inter-cluster collaboration discovery, the discovery server 1230 may include a second data writer unit 1235, for sending inter-cluster collaboration request messages, to publish to a fourth topic 1224 associated with inter-cluster collaboration messages, a fourth data reader unit 1236, for receiving inter-cluster collaboration response messages, to subscribe to the fourth topic 1224 associated with inter-cluster collaboration messages, a third data writer unit 1237, for sending cluster reports, to publish to a fifth topic 1225 associated with cluster reports, a fifth reader unit 1238, for receiving cluster reports, to publish to the fifth topic 1221 associated with cluster reports.

Accordingly, each discovery server of further clusters within the network may be configured to publish and subscribe topics as the discovery server 1230 at the same topics for the fourth topic 1224 and the fifth topic 1225. Accordingly, the discovery server 1230 may send inter-cluster collaboration requests to each further cluster with its second data writer unit 1235 and receive inter-cluster collaboration responses from further clusters with its fourth reader unit 1236. Furthermore, the discovery server 1230 may send cluster reports to the further clusters with its third writer unit 1237 and receive cluster reports with its fifth reader unit 1238.

FIG. 13 shows an example of a method. The method may include obtaining 1301 context information of a plurality of nodes that are configured to communicate according to a publish and subscribe pattern, wherein the context information represents attributes associated with services that each node is able to provide for a collaboration with a further node, determining 1302, in response to a received collaboration request representative of one or more conditions of a collaboration sought by a requester node, one or more nodes of the plurality of nodes that meet the one or more conditions of the collaboration based on the context information of the plurality of nodes, encoding 1303 discovery information for a transmission to the requester node, wherein the discovery information is representative of an attribute required to communicate with the determined one or more nodes according to the publish and subscribe pattern.

The following examples pertain to further aspects of this disclosure.

In example 1, the subject matter includes a device that may include: a processor configured to: obtain context information of a plurality of nodes that are configured to communicate according to a publish and subscribe pattern, can optionally include that the context information represents attributes associated with services that each node is able to provide for a collaboration with a further node; determine, in response to a received collaboration request representative of one or more conditions of a collaboration sought by a requester node, one or more nodes of the plurality of nodes that meet the one or more conditions of the collaboration based on the context information of the plurality of nodes; encode discovery information for a transmission to the requester node, can optionally include that the discovery information is representative of an attribute required to communicate with the determined one or more nodes according to the publish and subscribe pattern.

In example 2, the subject matter of example 1, can optionally include that the discovery information includes information representing, for each node, at least one of an identifier, one or more publishing topics and endpoints through which the respective node publishes, one or more subscribed topics and endpoints to which the respective node is subscribed, and/or one or more services provided by the respective node. In example 3, the subject matter of any one of examples 1 or 2, can optionally include that the context information includes information representing, for each node, at least one of a type of the respective node, a role associated with the respective node, available computing and/or communication resources of the respective node, sensing capabilities of the respective node, resource utilization status information with respect to the computing and/or communication resource of the respective node, a location associated with the respective node, a heading associated with the respective node, a velocity associated with the respective node.

In example 4, the subject matter of any one of examples 1 to 3, can optionally include that the one or more conditions of the collaboration include at least one of a location condition representing a location associated with the collaboration, a sensing condition representing sensor requirements for the collaboration, a computing condition representing computing requirements for the collaboration, a communication condition representing communication requirements for the collaboration. In example 5, the subject matter of any one of examples 1 to 4, may further include: a communication interface configured to receive the context information and discovery information of the plurality of nodes. In example 6, the subject matter of example 5, can optionally include that the communication interface is configured to communicate with a first group nodes to receive the context information and the discovery information of the first group of nodes; can optionally include that the communication interface is configured to communicate with at least one further device that is connected to a second group of nodes and configured to provide a discovery service to the second group of nodes to receive the context information and the discovery information of the second group of nodes.

In example 7, the subject matter of example 6, can optionally include that the communication interface is configured to receive the context information periodically from the first group of nodes and/or from the at least one further device. In example 8, the subject matter of example 7: can optionally include that a full reporting type of the received context information includes the attributes associated with the services and an incremental reporting type of the received context information includes changed attributes associated with the services that are different than the attributes provided by a previously received context information. In example 9, the subject matter of any one of examples 6 to 8, can optionally include that a local cluster includes the first group of nodes and at least one or more further clusters include the second group of nodes; can optionally include that the processor is further configured to determine, in response to the collaboration request received from the local cluster, the one or more nodes from the local cluster and the one or more further clusters based on the context information of the plurality of nodes; can optionally include that the processor is further configured to determine, in response to the collaboration request received from the one or more further clusters, the one or more nodes from the local cluster based on the context information of the first group of nodes.

In example 10, the subject matter of example 9, can optionally include that the processor is configured to incorporate further nodes to the local cluster based on a subscription request received from the further nodes. can optionally include that the processor is further configured, in response to an incorporation of a further node, to encode an eligibility message for a transmission to the requester node, the eligibility message representative of that the incorporated further node meets the one or more conditions of the collaboration sought by the requester node. In example 11, the subject matter of example 10, can optionally include that the processor is further configured to determine whether the determined one or more nodes maintain meeting the one or more conditions of the collaboration sought by the requester node; can optionally include that the processor is further configured to, in response to a determination that one of the determined nodes not maintaining meeting the one or more conditions of the collaboration sought by the requester node, provide information to the requester node that is representative of the determination.

In example 12, the subject matter of any one of examples 9 to 11, can optionally include that the processor is configured to generate aggregated information associated with the first group of nodes based on the discovery information and the context information of the first group of nodes to be sent for a discovery of the first group of nodes by the one or more further clusters periodically or in response to a request received from the one or more further clusters. In example 13, the subject matter of example 12, can optionally include that the aggregated information includes information representing at least one of a number of nodes for each node type, a number of nodes for each associated role, information representing coverage area of each sensor associated with each node, a map of aggregated coverage area of sensors associated with the local cluster, available computing resources of each node, available communication resources of each node, available capabilities of each node, latest compute resource utilization status information; a performance metric associated with performance of each node.

In example 14, the subject matter of any one of examples 9 to 13, can optionally include that the processor is configured to request information from at least one further device to receive at least the discovery information for the second group of nodes in response to the collaboration request received from the local cluster. In example 15, the subject matter of any one of examples 9 to 14, can optionally include that the processor is configured to encode an inter-cluster collaboration message for a transmission to the at least one further device, the inter-cluster collaboration message representative of the one or more conditions of the collaboration sought by the requester node; can optionally include that the processor is further configured to decode a received inter-cluster collaboration message from the at least one further device, the received inter-cluster collaboration message representative of the discovery information and/or the context information of one or more nodes of the second group of nodes meeting the one or more conditions of the collaboration sought by the requester node.

In example 16, the subject matter of any one of examples 9 to 15, can optionally include that the processor is configured to decode an inter-cluster report message received from each of a plurality of clusters, can optionally include that each inter-cluster report message includes aggregated information associated with a subset of the second group of nodes and represents the context associated with the subset of the second group of nodes. In example 17, the subject matter of example 16, can optionally include that the processor is configured to determine one or more clusters from the plurality of clusters that includes one or more candidate nodes based on the one or more conditions of the collaboration sought by the requester node and based on received aggregated information associated with each subset of the second group of nodes. In example 18, the subject matter of example 17, can optionally include that the processor is further configured to encode the inter-cluster collaboration messages only for a transmission to the determined one or more clusters.

In example 19, the subject matter of any one of examples 9 to 18, can optionally include that the processor is further configured to select some of the determined one or more nodes that meet the one or more conditions of the collaboration based on available resources associated with the one or more clusters including with the determined one or more nodes; can optionally include that the encoded discovery information includes discovery information of the selected nodes. In example 20, the subject matter of any one of examples 9 to 19, can optionally include that the processor is further configured to select among the determined one or more nodes that meet the one or more conditions of the collaboration with an occupancy parameter representative of occupancy of resources of each of the one or more clusters to balance utilization or occupancy of collaboration resources among the one or more clusters; can optionally include that the encoded discovery information includes discovery information of the selected nodes. In example 21, the subject matter of any one of examples 9 to 20, can optionally include that the processor is further configured to select among the determined one or more nodes that meet the one or more conditions of the collaboration for each cluster with an occupancy parameter representative of occupancy of resources of each of the determined one or more nodes of the respective cluster to balance utilization or occupancy of collaboration resources among the determined one or more nodes of the respective cluster; can optionally include that the encoded discovery information includes discovery information of the selected nodes.

In example 22, the subject matter of any one of examples 1 to 21, can optionally include that the requester node is an autonomous machine, and the plurality on nodes includes further autonomous machines. In example 23, the subject matter of any one of examples 1 to 22, can optionally include that the device is a discovery server, and the at least one further device includes a plurality of further discovery servers. In example 24, the subject matter of any one of examples 1 to 23, may further include a memory configured to store the context information of the plurality of nodes; can optionally include that the processor is further configured to update the stored context information based on received context information from each node.

In example 25, the subject matter includes a method that may include: obtaining context information of a plurality of nodes that are configured to communicate according to a publish and subscribe pattern, can optionally include that the context information represents attributes associated with services that each node is able to provide for a collaboration with a further node; determining, in response to a received collaboration request representative of one or more conditions of a collaboration sought by a requester node, one or more nodes of the plurality of nodes that meet the one or more conditions of the collaboration based on the context information of the plurality of nodes; encoding discovery information for a transmission to the requester node, can optionally include that the discovery information is representative of an attribute required to communicate with the determined one or more nodes according to the publish and subscribe pattern.

In example 26, the subject matter of example 25, can optionally include that the discovery information includes information representing, for each node, at least one of an identifier, one or more publishing topics and endpoints through which the respective node publishes, one or more subscribed topics and endpoints to which the respective node is subscribed, and/or one or more services provided by the respective node. In example 27, the subject matter of any one of examples 25 or 26, can optionally include that the context information includes information representing, for each node, at least one of a type of the respective node, a role associated with the respective node, available computing and/or communication resources of the respective node, sensing capabilities of the respective node, resource utilization status information with respect to the computing and/or communication resource of the respective node, a location associated with the respective node, a heading associated with the respective node, a velocity associated with the respective node.

In example 28, the subject matter of any one of examples 25 to 27, can optionally include that the one or more conditions of the collaboration include at least one of a location condition representing a location associated with the collaboration, a sensing condition representing sensor requirements for the collaboration, a computing condition representing computing requirements for the collaboration, a communication condition representing communication requirements for the collaboration. In example 29, the subject matter of any one of examples 25 to 28, may further include: receiving the context information and discovery information of the plurality of nodes. In example 30, the subject matter of example 29, may further include: communicating with a first group nodes to receive the context information and the discovery information of the first group of nodes; communicating with at least one further device that is connected to a second group of nodes and configured to provide a discovery service to the second group of nodes to receive the context information and the discovery information of the second group of nodes.

In example 31, the subject matter of example 30, receiving the context information periodically from the first group of nodes and/or from the at least one further device. In example 32, the subject matter of example 31: can optionally include that a full reporting type of the received context information includes the attributes associated with the services and an incremental reporting type of the received context information includes changed attributes associated with the services that are different than the attributes provided by a previously received context information. In example 33, the subject matter of any one of examples 30 to 32, can optionally include that a local cluster includes the first group of nodes and at least one or more further clusters include the second group of nodes; can optionally include that the method further includes determining, in response to the collaboration request received from the local cluster, the one or more nodes from the local cluster and the one or more further clusters based on the context information of the plurality of nodes, and determining, in response to the collaboration request received from the one or more further clusters, the one or more nodes from the local cluster based on the context information of the first group of nodes.

In example 34, the subject matter of example 33, may further include: incorporating further nodes to the local cluster based on a subscription request received from the further nodes; and encoding, in response to an incorporation of a further node, an eligibility message for a transmission to the requester node, the eligibility message representative of that the incorporated further node meets the one or more conditions of the collaboration sought by the requester node. In example 35, the subject matter of example 34, may further include: determining whether the determined one or more nodes maintain meeting the one or more conditions of the collaboration sought by the requester node; providing, in response to a determination that one of the determined nodes not maintaining meeting the one or more conditions of the collaboration sought by the requester node, information to the requester node that is representative of the determination. In example 36, the subject matter of any one of examples 33 to 35, may further include: generating aggregated information associated with the first group of nodes based on the discovery information and the context information of the first group of nodes to be sent for a discovery of the first group of nodes by the one or more further clusters periodically or in response to a request received from the one or more further clusters.

In example 37, the subject matter of example 36, can optionally include that the aggregated information includes information representing at least one of a number of nodes for each node type, a number of nodes for each associated role, information representing coverage area of each sensor associated with each node, a map of aggregated coverage area of sensors associated with the local cluster, available computing resources of each node, available communication resources of each node, available capabilities of each node, latest compute resource utilization status information; a performance metric associated with performance of each node. In example 38, the subject matter of any one of examples 33 to 37, may further include: requesting information from at least one further device to receive at least the discovery information for the second group of nodes in response to the collaboration request received from the local cluster. In example 39, the subject matter of any one of examples 33 to 38, may further include: encoding an inter-cluster collaboration message for a transmission to the at least one further device, the inter-cluster collaboration message representative of the one or more conditions of the collaboration sought by the requester node; and decoding a received inter-cluster collaboration message from the at least one further device, the received inter-cluster collaboration message representative of the discovery information and/or the context information of one or more nodes of the second group of nodes meeting the one or more conditions of the collaboration sought by the requester node.

In example 40, the subject matter of any one of examples 33 to 39, may further include: decoding an inter-cluster report message received from each of a plurality of clusters, can optionally include that each inter-cluster report message includes aggregated information associated with a subset of the second group of nodes and represents the context associated with the subset of the second group of nodes. In example 41, the subject matter of example may further include: determining one or more clusters from the plurality of clusters that includes one or more candidate nodes based on the one or more conditions of the collaboration sought by the requester node and based on received aggregated information associated with each subset of the second group of nodes. In example 42, the subject matter of example 41, may further include: encoding the inter-cluster collaboration messages only for a transmission to the determined one or more clusters. In example 43, the subject matter of any one of examples 33 to 42, may further include: selecting some of the determined one or more nodes that meet the one or more conditions of the collaboration based on available resources associated with the one or more clusters including the determined one or more nodes; can optionally include that the encoded discovery information includes discovery information of the selected nodes.

In example 44, the subject matter of any one of examples 33 to 42, may further include: selecting among the determined one or more nodes that meet the one or more conditions of the collaboration with an occupancy parameter representative of occupancy of resources of each of the one or more clusters to balance utilization or occupancy of collaboration resources among the one or more clusters; can optionally include that the encoded discovery information includes discovery information of the selected nodes. In example 45, the subject matter of any one of examples 33 to 44, may further include: selecting among the determined one or more nodes that meet the one or more conditions of the collaboration for each cluster with an occupancy parameter representative of occupancy of resources of each of the determined one or more nodes of the respective cluster to balance utilization or occupancy of collaboration resources among the determined one or more nodes of the respective cluster; can optionally include that the encoded discovery information includes discovery information of the selected nodes.

In example 46, the subject matter of any one of examples 25 to 45, can optionally include that the requester node is an autonomous machine, and the plurality on nodes includes further autonomous machines. In example 47, the subject matter of any one of examples 25 to 46, can optionally include that a discovery server performs the method, and the at least one further device includes a plurality of further discovery servers. In example 48, the subject matter of any one of examples 25 to 47, may further include: storing the context information of the plurality of nodes; updating the stored context information based on received context information from each node.

In example 49, a non-transitory computer-readable medium may include one or more instructions which, if executed by a processor, cause the processor to: obtain context information of a plurality of nodes that are configured to communicate according to a publish and subscribe pattern, can optionally include that the context information represents attributes associated with services that each node is able to provide for a collaboration with a further node; determine, in response to a received collaboration request representative of one or more conditions of a collaboration sought by a requester node, one or more nodes of the plurality of nodes that meet the one or more conditions of the collaboration based on the context information of the plurality of nodes; encode discovery information for a transmission to the requester node, can optionally include that the discovery information is representative of an attribute required to communicate with the determined one or more nodes according to the publish and subscribe pattern. In example 50, A non-transitory computer-readable medium may include one or more instructions which, if executed by a processor, cause the processor to perform operations as provided in examples 1 to 24, or perform methods as provided in examples 25 to 48, In example 51, the subject matter includes a device that may include: a processor configured to: obtain context information representative of attributes associated with services that each node is able to provide to collaborate with a further node of a plurality of nodes that are configured to communicate according to a publish/subscribe pattern; identify, for a requester node, one or more nodes from the plurality of nodes that are eligible to meet conditions of a collaboration indicated by the requester node based on the context information of the plurality of nodes; encode discovery information for a transmission to the requester node, can optionally include that the discovery information includes information for the requester mode to establish a communication with the identified one or more nodes according to the publish/subscribe pattern. In example 52, the subject matter of example 51, further configured to perform operations as provided in examples 1 to 24, In example 53, the subject matter includes a node of a collaboration network, the node may include: a processor configured to: encode context information representative of attributes associated with services that the node is able to provide for a collaboration with a further node for a transmission to a further communication device; encode a collaboration request for a transmission to the further communication device, the collaboration request representative of one or more conditions of a collaboration sought by the node; configure communication with one or more further nodes to provide a service in collaboration with the one more further nodes based on discovery information received from the further communication device, can optionally include that the discovery information is representative of an attribute required to communicate with the one or more further nodes according to the publish and subscribe pattern.

In example 54, the subject matter of example 53, can optionally include that the processor is configured to encode the context information periodically; can optionally include that a first type of context information may include a plurality of attributes is encoded for a transmission according to a first period; can optionally include that a second type of context information may include only changed attributes of the plurality of attributes is encoded for a transmission according to a second period. In example 55, the subject matter of example 53 or 56, can optionally include that the discovery information includes information representing, for each node of the one or more further nodes, at least one of an identifier, one or more publishing topics and endpoints through which the respective node publishes, one or more subscribed topics and endpoints to which the respective node is subscribed, and/or one or more services provided by the respective node.

In example 56, the subject matter of example 55, can optionally include that the processor is further configured to subscribe the node for at least one of a publishing topic of the one or more further nodes to configure the communication according to the publish and subscribe pattern. In example 57, the subject matter of example 55 or 56, can optionally include that the processor is further configured to publish within at least one of a subscribed topic of the one or more further nodes to configure the communication according to the publish and subscribe pattern. In example 58, the subject matter of any one of examples 53 to 57, can optionally include that the context information includes information representing, for the node, at least one of a type of the node, a role associated with the node, available computing and/or communication resources of the node, sensing capabilities of the node, resource utilization status information with respect to the computing and/or communication resource of the node, a location of the node, a heading associated with the node, a velocity associated with the node. In example 59, the subject matter of any one of examples 53 to 58, can optionally include that the one or more conditions of the collaboration include at least one of a location condition representing a location associated with the collaboration, a sensing condition representing sensor requirements for the collaboration, a computing condition representing computing requirements for the collaboration, a communication condition representing communication requirements for the collaboration.

In example 60, the subject matter includes a method that may include: encoding context information representative of attributes associated with services that the node is able to provide for a collaboration with a further node for a transmission to a further communication device; encoding a collaboration request for a transmission to the further communication device, the collaboration request representative of one or more conditions of a collaboration sought by the node; configuring communication with one or more further nodes to provide a service in collaboration with the one more further nodes based on discovery information received from the further communication device, can optionally include that the discovery information is representative of an attribute required to communicate with the one or more further nodes according to the publish and subscribe pattern.

In example 61, the subject matter of example 60, may further include: encoding the context information periodically; can optionally include that a first type of context information includes a plurality of attributes is encoded for a transmission according to a first period; can optionally include that a second type of context information includes only changed attributes of the plurality of attributes is encoded for a transmission according to a second period. In example 62, the subject matter of example 60 or 61, can optionally include that the discovery information includes information representing, for each node of the one or more further nodes, at least one of: an identifier, one or more publishing topics and endpoints through which the respective node publishes, one or more subscribed topics and endpoints to which the respective node is subscribed, and/or one or more services provided by the respective node.

In example 63, the subject matter of example 62, may further include: subscribing the node for at least one of a publishing topic of the one or more further nodes to configure the communication according to the publish and subscribe pattern. In example 64, the subject matter of example 62 or 63, may further include: publishing within at least one of a subscribed topic of the one or more further nodes to configure the communication according to the publish and subscribe pattern. In example 65, the subject matter of any one of examples 60 to 64, can optionally include that the context information includes information representing, for the node, at least one of a type of the node, a role associated with the node, available computing and/or communication resources of the node, sensing capabilities of the node, resource utilization status information with respect to the computing and/or communication resource of the node, a location of the node, a heading associated with the node, a velocity associated with the node. In example 66, the subject matter of any one of examples 60 to 65, can optionally include that the one or more conditions of the collaboration include at least one of a location condition representing a location associated with the collaboration, a sensing condition representing sensor requirements for the collaboration, a computing condition representing computing requirements for the collaboration, a communication condition representing communication requirements for the collaboration.

In example 67, a non-transitory computer-readable medium may include one or more instructions which, if executed by a processor, cause the processor to: encode context information representative of attributes associated with services that the node is able to provide for a collaboration with a further node for a transmission to a further communication device; encode a collaboration request for a transmission to the further communication device, the collaboration request representative of one or more conditions of a collaboration sought by the node; configure communication with one or more further nodes to provide a service in collaboration with the one more further nodes based on discovery information received from the further communication device, can optionally include that the discovery information is representative of an attribute required to communicate with the one or more further nodes according to the publish and subscribe pattern. In example 68, a non-transitory computer-readable medium may include one or more instructions which, if executed by a processor, cause the processor to perform operations as provided in examples 53 to 59, or perform the methods as provided in examples 60 to 67, In example 69, the subject matter includes a node of a collaboration network, the node may include: a processor configured to: encode context information representative of attributes associated with services that the node is able to provide to collaborate with a further node for a transmission to a discovery server; generate information representing one or more conditions of a collaboration sought by the node; encode a request message may include the generated information for a transmission to the discovery server; decode a response message, in response to the transmitted request message, to obtain discovery information, can optionally include that the discovery information is representative of an attribute required to communicate with one or more further nodes; configure a communication according to the publish/subscribe pattern with the one or more further nodes to provide a service in collaboration with the one more further nodes. In example 70, the subject matter of example 69, can optionally include that the node is further configured to provide operations as provided in examples 53 to 59.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or a controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception.

Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:

a processor configured to:

obtain context information of a plurality of nodes that are configured to communicate according to a publish and subscribe pattern, wherein the context information represents attributes associated with services that each node is able to provide for a collaboration with a further node;

determine, in response to a received collaboration request representative of one or more conditions of a collaboration sought by a requester node, one or more nodes of the plurality of nodes that meet the one or more conditions of the collaboration based on the context information of the plurality of nodes;

wherein the determination is based on identifying a plurality of clusters whose aggregated information satisfies the one or more conditions and identifying the one or more nodes from within the identified plurality of clusters, wherein the aggregated information summarizes the context of nodes within each cluster; and encode discovery information for a transmission to the requester node, wherein the discovery information is representative of an attribute required to communicate with the determined one or more nodes according to the publish and subscribe pattern.

2. The device of claim 1, wherein the discovery information comprises information representing, for each node, at least one of an identifier, one or more publishing topics and endpoints through which the respective node publishes, one or more subscribed topics and endpoints to which the respective node is subscribed, and/or one or more services provided by the respective node.

3. The device of claim 1, wherein the context information comprises information representing, for each node, at least one of a type of the respective node, a role associated with the respective node, available computing and/or communication resources of the respective node, sensing capabilities of the respective node, resource utilization status information with respect to the computing and/or communication resource of the respective node, a location associated with the respective node, a heading associated with the respective node, a velocity associated with the respective node.

4. The device of claim 1, wherein the one or more conditions of the collaboration comprise at least one of: a location condition representing a location associated with the collaboration, a sensing condition representing sensor requirements for the collaboration, a computing condition representing computing requirements for the collaboration, a communication condition representing communication requirements for the collaboration.

5. The device of claim 1, further comprising:

a communication interface configured to receive the context information and discovery information of the plurality of nodes.

6. The device of claim 5, wherein the communication interface is configured to communicate with a first group of nodes to receive the context information and the discovery information of the first group of nodes;

wherein the communication interface is configured to communicate with at least one further device that is connected to a second group of nodes and configured to provide a discovery service to the second group of nodes to receive the context information and the discovery information of the second group of nodes.

7. The device of claim 6, wherein the communication interface is configured to receive the context information periodically from the first group of nodes and/or from the at least one further device.

8. The device of claim 6, wherein a local cluster comprises the first group of nodes and at least one or more further clusters comprise the second group of nodes;

wherein the processor is further configured to determine, in response to the collaboration request received from the local cluster, the one or more nodes from the local cluster and the one or more further clusters based on the context information of the plurality of nodes;

wherein the processor is further configured to determine, in response to the collaboration request received from the one or more further clusters, the one or more nodes from the local cluster based on the context information of the first group of nodes.

9. The device of claim 6, wherein the processor is configured to generate the aggregated information associated with the first group of nodes based on the discovery information and the context information of the first group of nodes to be sent for a discovery of the first group of nodes by the one or more further clusters periodically or in response to a request received from the one or more further clusters;

wherein the aggregated information comprises information representing at least one of a number of nodes for each node type, a number of nodes for each associated role, information representing coverage area of each sensor associated with each node, a map of aggregated coverage area of sensors associated with the local cluster, available computing resources of each node, available communication resources of each node, available capabilities of each node, latest compute resource utilization status information; a performance metric associated with performance of each node.

10. The device of claim 6, wherein the processor is configured to encode an inter-cluster collaboration message for a transmission to the at least one further device, the inter-cluster collaboration message representative of the one or more conditions of the collaboration sought by the requester node;

wherein the processor is further configured to decode a received inter-cluster collaboration message from the at least one further device, the received inter-cluster collaboration message representative of the discovery information and/or the context information of one or more nodes of the second group of nodes meeting the one or more conditions of the collaboration sought by the requester node.

11. The device of claim 6, wherein the processor is further configured to decode an inter-cluster report message received from each of a plurality of clusters, wherein each inter-cluster report message comprises aggregated information associated with a subset of the second group of nodes and represents the context associated with the subset of the second group of nodes.

12. The device of claim 11, wherein the processor is configured to determine one or more clusters from the plurality of clusters that includes one or more candidate nodes based on the one or more conditions of the collaboration sought by the requester node and based on received aggregated information associated with each subset of the second group of nodes;

wherein the processor is further configured to encode the inter-cluster collaboration messages only for a transmission to the determined one or more clusters.

13. The device of claim 12, wherein the processor is further configured to select some of the determined one or more nodes that meet the one or more conditions of the collaboration based on predefined policy associated with resources of the one or more clusters including the determined one or more nodes;

wherein the encoded discovery information comprises discovery information of the selected nodes.

14. The device of claim 1, wherein the requester node is an autonomous machine, and the plurality on nodes comprises further autonomous machines.

15. The device of claim 1, wherein the device is a discovery server, and the at least one further device comprises a plurality of further discovery servers.

16. A non-transitory computer-readable medium comprising one or more instructions which, if executed by a processor, cause the processor to:

obtain context information of a plurality of nodes that are configured to communicate according to a publish and subscribe pattern, wherein the context information represents attributes associated with services that each node is able to provide for a collaboration with a further node;

determine, in response to a received collaboration request representative of one or more conditions of a collaboration sought by a requester node, one or more nodes of the plurality of nodes that meet the one or more conditions of the collaboration based on the context information of the plurality of nodes;

wherein the determination is based on identifying a plurality of clusters whose aggregated information satisfies the one or more conditions and identifying the one or more nodes from within the identified plurality of clusters, wherein the aggregated information summarizes the context of nodes within each cluster; and encode discovery information for a transmission to the requester node, wherein the discovery information is representative of an attribute required to communicate with the determined one or more nodes according to the publish and subscribe pattern.

17. The non-transitory computer-readable medium of claim 16, wherein the context information comprises information representing, for each node, at least one of a type of the respective node, a role associated with the respective node, available computing and/or communication resources of the respective node, sensing capabilities of the respective node, resource utilization status information with respect to the computing and/or communication resource of the respective node, a location associated with the respective node, a heading associated with the respective node, a velocity associated with the respective node.

18. A node of a collaboration network, the node comprising:

a processor configured to:

encode context information representative of attributes associated with services that the node is able to provide for a collaboration with a further node for a transmission to a further communication device, wherein the encoding of the context information is performed periodically and comprises encoding a first type of context information comprising a plurality of attributes for a transmission according to a first period and encoding a second type of context information comprising only changed attributes of the plurality of attributes for a transmission according to a second period, wherein the first period is greater than the second period;

encode a collaboration request for a transmission to the further communication device, the collaboration request representative of one or more conditions of a collaboration sought by the node;

configure communication with one or more further nodes to provide a service in collaboration with the one more further nodes based on discovery information received from the further communication device, wherein the discovery information is representative of an attribute required to communicate with the one or more further nodes according to the publish and subscribe pattern.

19. The node of claim 18, wherein the discovery information comprises information representing, for each node of the one or more further nodes, at least one of an identifier, one or more publishing topics and endpoints through which the respective node publishes, one or more subscribed topics and endpoints to which the respective node is subscribed, and/or one or more services provided by the respective node.

20. The node of claim 18, wherein the processor is further configured to subscribe the node for at least one of a publishing topic of the one or more further nodes to configure the communication according to the publish and subscribe pattern.

21. The node of claim 18, wherein the processor is further configured to publish within at least one of a subscribed topic of the one or more further nodes to configure the communication according to the publish and subscribe pattern.

22. The node of claim 18, wherein the context information comprises information representing, for the node, at least one of a type of the node, a role associated with the node, available computing and/or communication resources of the node, sensing capabilities of the node, resource utilization status information with respect to the computing and/or communication resource of the node, a location of the node, a heading associated with the node, a velocity associated with the node.

23. A non-transitory computer-readable medium comprising one or more instructions which, if executed by a processor, cause the processor to:

encode context information representative of attributes associated with services that the node is able to provide for a collaboration with a further node for a transmission to a further communication device, wherein the encoding of the context information is performed periodically and comprises encoding a first type of context information comprising a plurality of attributes for a transmission according to a first period and encoding a second type of context information comprising only changed attributes of the plurality of attributes for a transmission according to a second period, wherein the first period is greater than the second period;

encode a collaboration request for a transmission to the further communication device, the collaboration request representative of one or more conditions of a collaboration sought by the node;

configure communication with one or more further nodes to provide a service in collaboration with the one more further nodes based on discovery information received 5 from the further communication device, wherein the discovery information is representative of an attribute required to communicate with the one or more further nodes according to the publish and subscribe pattern.

24. The non-transitory computer-readable medium of 10 claim 23, comprising the one or more instructions to further cause the processor at least one of to subscribe the node for at least one of a publishing topic of the one or more further nodes to configure the communication according to the publish and subscribe pattern, and to subscribe the node for 15 at least one of a publishing topic of the one or more further nodes to configure the communication according to the publish and subscribe pattern.

* * * * *